(12) United States Patent
Okada et al.

(10) Patent No.: US 10,578,032 B2
(45) Date of Patent: Mar. 3, 2020

(54) INTERNAL COMBUSTION ENGINE AND CONTROL METHOD OF INTERNAL COMBUSTION ENGINE

(71) Applicant: TOYOTA JIDOSHA KABUSHIKI KAISHA, Toyota-shi, Aichi-ken (JP)

(72) Inventors: Yoshihiro Okada, Susono (JP); Fumitsugu Tsuru, Shizuoka-ken (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 114 days.

(21) Appl. No.: 15/622,335

(22) Filed: Jun. 14, 2017

(65) Prior Publication Data
US 2017/0363020 A1 Dec. 21, 2017

(30) Foreign Application Priority Data
Jun. 16, 2016 (JP) .................................. 2016-120069

(51) Int. Cl.
*F02D 13/02* (2006.01)
*F02B 37/18* (2006.01)
(Continued)

(52) U.S. Cl.
CPC .......... *F02D 13/0219* (2013.01); *F01L 1/047* (2013.01); *F01L 1/344* (2013.01);
(Continued)

(58) Field of Classification Search
CPC ............. F02D 13/0219; F02D 13/0273; F02D 41/0002; F02D 41/006; F02D 41/221;
(Continued)

(56) References Cited

U.S. PATENT DOCUMENTS 7,013,852 B2 * 3/2006 Harada ............... F02D 41/2451
123/90.15
7,191,589 B2 * 3/2007 Yasui .................... F01L 1/3442
123/90.15

(Continued)

FOREIGN PATENT DOCUMENTS

DE 10001458 A1 7/2001
EP 1223321 A2 * 7/2002
(Continued)

*Primary Examiner* — Thai Ba Trieu
(74) *Attorney, Agent, or Firm* — Hunton Andrews Kurth LLP

(57) ABSTRACT

An electronic control unit of an internal combustion engine is configured to control the fuel injection valve and to control a spark plug if necessary such that fuel is combusted by pre-mixture compression ignition combustion or flame propagation combustion. The electronic control unit is configured to perform homogeneous combustion in a flame ignition operation range when switching failure has not occurred, the homogeneous combustion being combustion in which fuel homogeneously diffused into the combustion chamber is ignited using the spark plug and is combusted by flame propagation combustion. The electronic control unit is configured to perform spray-guided stratified combustion in a second operation range when the switching failure has occurred, the spray-guided stratified combustion being combustion in which fuel in the fuel injection path is ignited using the spark plug and is combusted by the flame propagation combustion.

10 Claims, 20 Drawing Sheets

(51) Int. Cl.
*F01L 1/047* (2006.01)
*F01L 1/344* (2006.01)
*F02B 1/02* (2006.01)
*F02B 1/12* (2006.01)
*F02B 37/22* (2006.01)
*F02D 41/00* (2006.01)
*F02D 41/22* (2006.01)
*F02D 41/30* (2006.01)
*F02P 15/00* (2006.01)
*F02D 41/38* (2006.01)

(52) U.S. Cl.
CPC ............... *F02B 1/02* (2013.01); *F02B 1/12* (2013.01); *F02B 37/18* (2013.01); *F02B 37/22* (2013.01); *F02D 13/0273* (2013.01); *F02D 41/0002* (2013.01); *F02D 41/221* (2013.01); *F02D 41/3029* (2013.01); *F02P 15/006* (2013.01); *F02D 2041/001* (2013.01); *F02D 2041/389* (2013.01)

(58) Field of Classification Search
CPC ............ F02D 41/3029; F02D 41/3035; F02D 2041/001; F02D 2041/389; F02B 1/12; F02B 11/00; F02B 11/02; F02B 17/005; F02B 23/105; F02B 37/18; F02B 37/22; F01L 1/047; F01L 1/344; F02P 15/005; Y02T 10/123; Y02T 10/144; Y02T 10/18; Y02T 10/47
USPC ................ 60/602, 605.1; 701/104–108; 123/90.15–90.18, 346, 403
See application file for complete search history.

(56) References Cited

U.S. PATENT DOCUMENTS

| | | | | |
|---|---|---|---|---|
| 7,222,594 B2* | 5/2007 | Hoshino | ............ | F02D 41/2451 123/90.15 |
| 7,292,927 B2* | 11/2007 | Yasui | ............ | F01L 1/34 701/103 |
| 7,295,912 B2* | 11/2007 | Yasui | ............ | F01L 1/3442 123/90.15 |
| 7,331,317 B2* | 2/2008 | Yasui | ............ | F02D 13/0207 123/90.15 |
| 7,360,515 B2* | 4/2008 | Hoshino | ............ | F02D 41/2451 123/90.15 |
| 7,412,322 B1 | 8/2008 | Rask et al. | | |
| 7,469,180 B2* | 12/2008 | Yasui | ............ | F02D 13/0207 701/103 |
| 7,610,897 B2* | 11/2009 | Rayl | ............ | F02D 13/0207 123/90.15 |
| 7,669,578 B2* | 3/2010 | Yamashita | ............ | F02D 41/3041 123/295 |
| 7,740,003 B2* | 6/2010 | Rayl | ............ | F02D 13/0207 123/90.15 |
| 7,845,319 B2* | 12/2010 | Rayl | ............ | F02D 13/0207 123/90.15 |
| 7,974,766 B2* | 7/2011 | Rayl | ............ | F02D 13/0207 123/90.15 |
| 7,979,195 B2* | 7/2011 | Rayl | ............ | F02D 13/0207 123/90.15 |
| 8,036,855 B2* | 10/2011 | Kuzuyama | ............ | F02D 13/0215 123/308 |
| 2007/0180824 A1 | 8/2007 | Yamagata | | |
| 2009/0093946 A1* | 4/2009 | Yamashita | ............ | F01L 1/08 123/90.15 |
| 2013/0019828 A1 | 1/2013 | Nagatsu et al. | | |
| 2014/0299107 A1 | 10/2014 | Iwai et al. | | |
| 2015/0114342 A1* | 4/2015 | Iwai | ............ | F02D 41/3035 123/305 |
| 2015/0198104 A1 | 7/2015 | Haehara et al. | | |
| 2016/0245128 A1* | 8/2016 | Shintani | ............ | F02D 13/0219 |
| 2017/0114729 A1* | 4/2017 | Ashikaga | ............ | F02D 41/0087 |
| 2018/0066599 A1* | 3/2018 | Narahara | ............ | F02D 41/401 |
| 2019/0063361 A1* | 2/2019 | Yamaguchi | ............ | F02D 41/3041 |

FOREIGN PATENT DOCUMENTS

| | | |
|---|---|---|
| JP | 2006274951 A | 10/2006 |
| JP | 2007205306 A | 8/2007 |
| JP | 2007255374 A | 10/2007 |
| JP | 2009-108854 A | 5/2009 |
| JP | 2010144558 A | 7/2010 |
| JP | 2011-214477 A | 10/2011 |
| JP | 2013113175 A | 6/2013 |
| JP | 2015081578 A | 4/2015 |
| JP | 2015135064 A | 7/2015 |

* cited by examiner

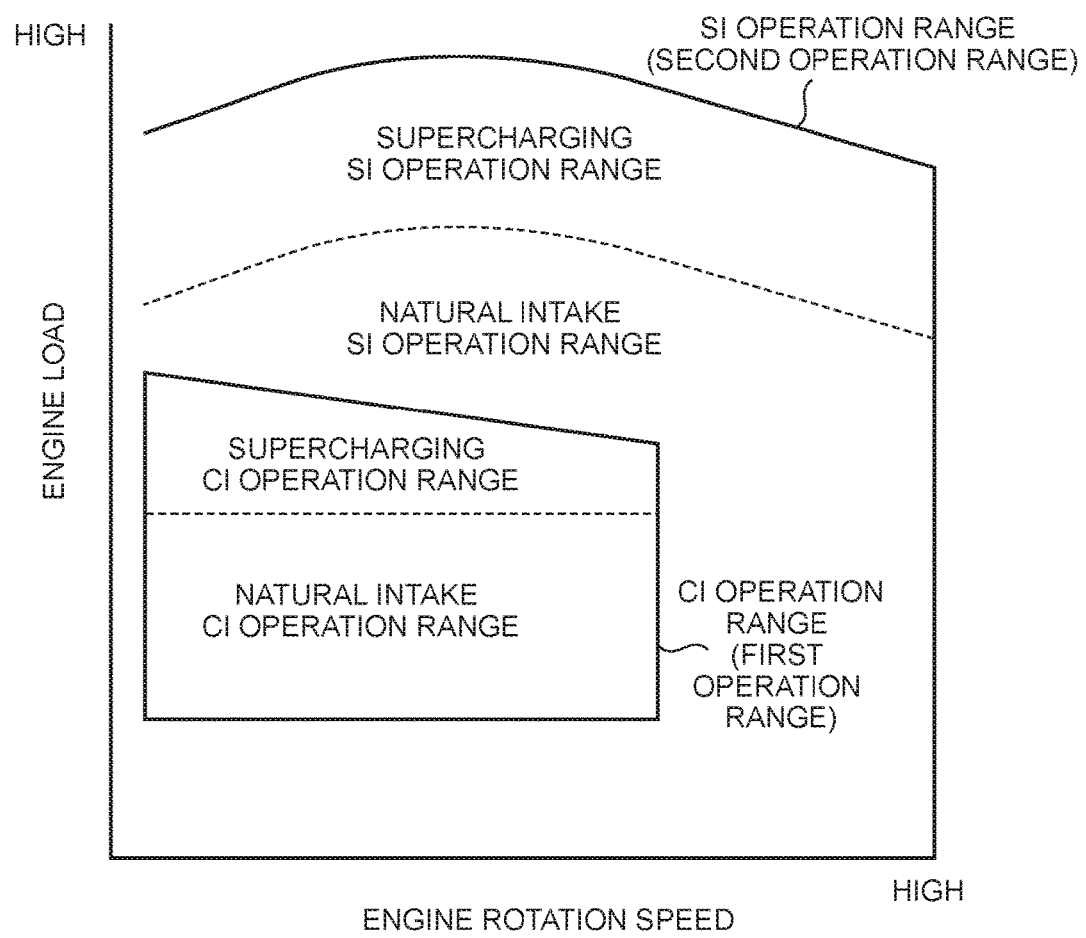

INTERNAL COMBUSTION ENGINE AND CONTROL METHOD OF INTERNAL COMBUSTION ENGINE

INCORPORATION BY REFERENCE

The disclosure of Japanese Patent Application No. 2016-120069 filed on Jun. 16, 2016 including the specification, drawings and abstract is incorporated herein by reference in its entirety.

BACKGROUND

1. Technical Field

The disclosure relates to an internal combustion engine and a control method of an internal combustion engine.

2. Description of Related Art

Japanese Patent Application Publication No. 2011-214477 (JP 2011-214477 A) discloses an internal combustion engine including a characteristic switching mechanism that can switch a lift characteristic of an exhaust valve between a first lift characteristic in which the exhaust valve is opened in an exhaust stroke and a second lift characteristic in which the exhaust valve is opened in an exhaust stroke and an intake stroke. JP 2011-214477 A also discloses a controller for an internal combustion engine configured to switch the lift characteristic of the exhaust valve to the first lift characteristic in an operation range in which fuel is combusted by flame propagation combustion and to switch the lift characteristic of the exhaust valve to the second lift characteristic in an operation range in which fuel is combusted by pre-mixture compression ignition combustion. In JP 2011-214477 A, high-temperature exhaust gas discharged from a cylinder in an exhaust stroke is sucked back into the cylinder in a subsequent intake stroke by opening the exhaust valve again in the intake stroke in the operation range in which fuel is combusted by pre-mixture compression ignition combustion, and a cylinder temperature is increased to a temperature at which pre-mixture compression ignition combustion can be carried out.

SUMMARY

However, in the technique disclosed in JP 2011-214477 A, a case in which the characteristic switching mechanism fails is not considered. Accordingly, when the characteristic switching mechanism fails for a certain reason and the lift characteristic of the exhaust valve cannot be switched from the second lift characteristic to the first lift characteristic, high-temperature exhaust gas is sucked back into the cylinder in the operation range in which fuel is combusted by flame propagation combustion. Accordingly, there is concern that the cylinder temperature may become excessively high in the operation range in which fuel is combusted by flame propagation combustion and abnormal combustion such as pre-ignition or knocking will occur.

The disclosure prevents occurrence of abnormal combustion when a characteristic switching mechanism fails.

A first aspect of the disclosure is an internal combustion engine. The internal combustion engine includes an engine body, a fuel injection valve, a spark plug, a characteristic switching mechanism, and an electronic control unit. The fuel injection valve is configured to directly inject fuel into a combustion chamber of the internal combustion engine. An electrode portion of the spark plug is disposed in one of the inside of a fuel injection path and the vicinity of the fuel injection path. The characteristic switching mechanism is configured to switch a lift characteristic between a first lift characteristic and a second lift characteristic. The first lift characteristic is a lift characteristic of an exhaust valve of opening the exhaust valve in an exhaust stroke. The second lift characteristic is a lift characteristic of the exhaust valve of opening the exhaust valve in the exhaust stroke and an intake stroke. The electronic control unit is configured to control the fuel injection valve and the spark plug such that fuel is combusted by one of pre-mixture compression ignition combustion and flame propagation combustion. The electronic control unit is configured to switch the lift characteristic of the exhaust valve to the second lift characteristic using the characteristic switching mechanism in a predetermined first operation range. The predetermined first operation range includes at least a part of a compression-ignition operation range. The compression ignition operation range is a range in which fuel is combusted by the pre-mixture compression ignition combustion. The electronic control unit is configured to switch the lift characteristic of the exhaust valve to the first lift characteristic using the characteristic switching mechanism in a predetermined second operation range. The predetermined second operation range includes at least a flame ignition operation range. The flame ignition operation range is a range in which fuel is combusted by the flame propagation combustion. The electronic control unit is configured to determine whether switching failure has occurred. The switching failure is failure in which the lift characteristic of the exhaust valve is not switchable from the second lift characteristic to the first lift characteristic using the characteristic switching mechanism. The electronic control unit is configured to perform homogeneous combustion in the flame ignition operation range when the electronic control unit determines that the switching failure has not occurred. The homogeneous combustion is combustion in which fuel homogeneously diffused into the combustion chamber is ignited using the spark plug and is combusted by the flame propagation combustion. The electronic control unit is configured to perform spray-guided stratified combustion in the second operation range when the electronic control unit determines that the switching failure has occurred. The spray-guided stratified combustion is combustion in which fuel in the fuel injection path is ignited using the spark plug and is combusted by the flame propagation combustion.

According to this configuration, it is possible to prevent occurrence of abnormal combustion when the characteristic switching mechanism is out of order.

In the internal combustion engine, the internal combustion engine may further include a throttle valve that is disposed in an intake air passage. The electronic control unit may be configured to control an opening degree of the throttle valve such that the opening degree becomes a target opening degree based on an engine load. When the electronic control unit determines that the switching failure has occurred, the electronic control unit may be configured to control the opening degree of the throttle valve such that the opening degree becomes one opening degree of a maximum opening degree and an opening degree higher than the target opening degree in the second operation range.

According to this configuration, in the second operation range in which the throttle opening degree is controlled to the target opening degree lower than the maximum opening degree based on the engine load, an amount of intake air flowing as new air into the combustion chamber via an intake port in an intake stroke can be increased. Accordingly, even when the exhaust valve is opened in the intake stroke in the second operation range, an amount of exhaust gas sucked back into the combustion chamber via an exhaust port can be decreased by an amount corresponding to the increase in the amount of intake air and it is thus possible to decrease an amount of internal EGR gas. As a result, since an increase of a cylinder temperature can be suppressed, it is possible to prevent occurrence of abnormal combustion. Since the amount of internal EGR gas also decreases, it is possible to prevent occurrence of misfiring.

In the internal combustion engine, the internal combustion engine may further include an exhaust turbocharger that is disposed in an exhaust gas passage and an exhaust gas adjuster. The exhaust gas adjuster may be configured to adjust a flow rate of exhaust gas flowing into a turbine of the exhaust turbocharger. The exhaust gas adjuster may be one of a waste gate valve and a variable nozzle. The electronic control unit may be configured to control an opening degree of the exhaust gas adjuster such that the opening degree becomes a target opening degree based on an engine load. When the electronic control unit determines that the switching failure has occurred, the electronic control unit may be configured to control the opening degree of the exhaust gas adjuster such that the opening degree becomes one opening degree of a maximum opening degree and an opening degree higher than the target opening degree in the second operation range.

According to this configuration, in the second operation range in which the waste gate valve is controlled to the target opening degree lower than the maximum opening degree based on the engine load to control turbocharging, it is possible to decrease a proportion of exhaust gas staying in an exhaust port or an exhaust manifold in the exhaust gas discharged from the combustion chamber in the exhaust stroke. Accordingly, even when the exhaust valve is opened in the intake stroke in a supercharging SI operation range, an amount of exhaust gas sucked back into the combustion chamber via the exhaust port in the intake stroke can be decreased and it is thus possible to decrease an amount of internal EGR gas. As a result, since an increase of a cylinder temperature can be suppressed, it is possible to prevent occurrence of abnormal combustion. Since the amount of internal EGR gas also decreases, it is possible to prevent occurrence of misfiring.

In the internal combustion engine, the internal combustion engine may further include a variable exhaust phase mechanism. The variable exhaust phase mechanism may be configured to change an exhaust phase. The exhaust phase may be a phase of an exhaust cam shaft with respect to a crank shaft. The electronic control unit may be configured to change the exhaust phase such that a valve opening timing of the exhaust valve in an intake stroke is a predetermined timing in the second operation range when the electronic control unit determines that the switching failure has occurred. The predetermined timing is a timing at which a rate of change in volume of the combustion chamber in the intake stroke is relatively small. According to this configuration, the valve opening timing of the exhaust valve in the intake stroke is controlled to a timing at which the rate of change in volume of the combustion chamber is relatively small. Accordingly, in comparison with a case in which the valve opening timing is controlled to a timing at which the rate of change in volume of the combustion chamber is relatively large, it is possible to decrease an amount of exhaust gas sucked back into the combustion chamber via the exhaust port in the intake stroke and to decrease an amount of internal EGR gas.

In the internal combustion engine, the electronic control unit may be configured to change the exhaust phase such that the valve opening timing of the exhaust valve in the intake stroke is an initial stage of the intake stroke when the electronic control unit determines that the switching failure has occurred. According to this configuration, since a period in which gas in a cylinder is cooled by heat exchange with an inner wall surface of the cylinder can be lengthened in the intake stroke by changing the exhaust phase such that the valve opening timing of the exhaust valve in the intake stroke is an initial stage of the intake stroke, it is possible to effectively suppress an increase in the cylinder temperature. Accordingly, it is possible to more effectively suppress abnormal combustion.

In the internal combustion engine, the electronic control unit may be configured to change the exhaust phase such that the valve opening timing of the exhaust valve in the intake stroke is a final stage of the intake stroke when the electronic control unit determines that the switching failure has occurred. According to this configuration, since exhaust gas is sucked back after a certain amount of air (new air) is sucked into the cylinder by changing the exhaust phase such that the valve opening timing of the exhaust valve in the intake stroke is a final stage of the intake stroke, it is possible to effectively suppress an increase in the amount of internal EGR gas. Accordingly, it is possible to more effectively suppress misfiring.

In the internal combustion engine, the internal combustion engine may further include a variable intake phase mechanism. The variable intake phase mechanism is configured to change an intake phase. The intake phase is a phase of an intake cam shaft with respect to a crank shaft. When the electronic control unit determines that the switching failure has occurred, the electronic control unit may be configured to change the intake phase in the second operation range and to control a valve closing timing of an intake valve is changed by one of the following controls: (i) the valve closing timing is advanced in a direction in which the valve closing timing moves away from an intake bottom dead center in comparison with a case in which the electronic control unit determines that the switching failure has not occurred, (ii) the valve closing timing is retarded in a direction which the valve closing timing moves away from an intake bottom dead center in comparison with a case in which the electronic control unit determines that the switching failure has not occurred. According to this configuration, an actual compression ratio is decreased by advancing or delaying the intake phase using the variable intake phase mechanism to advance or delay the valve closing timing of the intake valve in a direction in which the timing moves away from the intake bottom dead center in comparison with a normal state. Accordingly, since the cylinder temperature (a compression end temperature) can be decreased in comparison with in the normal state, it is possible to prevent occurrence of abnormal combustion.

In the internal combustion engine, the electronic control unit may be configured to perform the spray-guided stratified combustion in all the operation ranges when the electronic control unit determines that the switching failure has occurred. According to this configuration, it is possible to prevent combustion from being destabilized by switching of an operation mode.

In the internal combustion engine, the electronic control unit may be configured to determine whether the switching failure has occurred in the flame ignition operation range. The electronic control unit may be configured to prohibit an operation in a predetermined area and to combust fuel by the pre-mixture compression ignition combustion in the first operation range when an engine operating state transitions from the second operation range to the first operation range after the switching failure has occurred. The predetermined area may be at least one of the second operation range on a higher load side than the first operation range and the second operation range on a higher rotation speed side than the first operation range. According to this configuration, it is possible to prevent occurrence of abnormal combustion or the like which occurs by causing the internal combustion engine to operate in the second operation in which the twice-opening operation of the exhaust valve is not performed in the normal state when the electronic control unit determines that the switching failure has occurred.

A second aspect of the disclosure is a control method of an internal combustion engine. The internal combustion engine includes an engine body, a fuel injection valve, a spark plug, a characteristic switching mechanism, and an electronic control unit. The fuel injection valve is configured to directly inject fuel into a combustion chamber of the internal combustion engine. An electrode portion of the spark plug is disposed in one of the inside of a fuel injection path and the vicinity of the fuel injection path. The characteristic switching mechanism is configured to switch a lift characteristic between a first lift characteristic and a second lift characteristic. The first lift characteristic is a lift characteristic of an exhaust valve of opening the exhaust valve in an exhaust stroke. The second lift characteristic is a lift characteristic of the exhaust valve of opening the exhaust valve in the exhaust stroke and an intake stroke. The control method includes: controlling, by the electronic control unit, the fuel injection valve and the spark plug such that fuel is combusted by one of pre-mixture compression ignition combustion and flame propagation combustion; switching, by the electronic control unit, the lift characteristic of the exhaust valve to the second lift characteristic in a predetermined first operation range; switching, by the electronic control unit, the lift characteristic of the exhaust valve to the first lift characteristic in a predetermined second operation range; determining, by the electronic control unit, whether switching failure has occurred; performing, by the electronic control unit, homogeneous combustion in the flame ignition operation range when the electronic control unit determines that the switching failure has not occurred; and performing, by the electronic control unit, spray-guided stratified combustion in the second operation range when the electronic control unit determines that the switching failure has occurred. The predetermined first operation range includes at least a part of a compression ignition operation range. The compression ignition operation range is a range in which fuel is combusted by the pre-mixture compression ignition combustion. The predetermined second operation range includes at least a flame ignition operation range. The flame ignition operation range is a range in which fuel is combusted by the flame propagation combustion. The switching failure is failure in which the lift characteristic of the exhaust valve is not switchable from the second lift characteristic to the first lift characteristic by the electronic control unit. The homogeneous combustion is combustion in which fuel homogeneously diffused into the combustion chamber is ignited using the spark plug and is combusted by the flame propagation combustion. The spray-guided stratified combustion is combustion in which fuel in the fuel injection path is ignited using the spark plug and is combusted by the flame propagation combustion.

According to this configuration, it is possible to prevent occurrence of abnormal combustion when a characteristic switching mechanism is out of order.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein:

FIG. 7 is a diagram illustrating operation ranges of an engine body;

DETAILED DESCRIPTION OF EMBODIMENTS

Hereinafter, embodiments of the disclosure will be described in detail with reference to the accompanying drawings. In the following description, like elements will be referenced by like reference signs.

Figure 1:
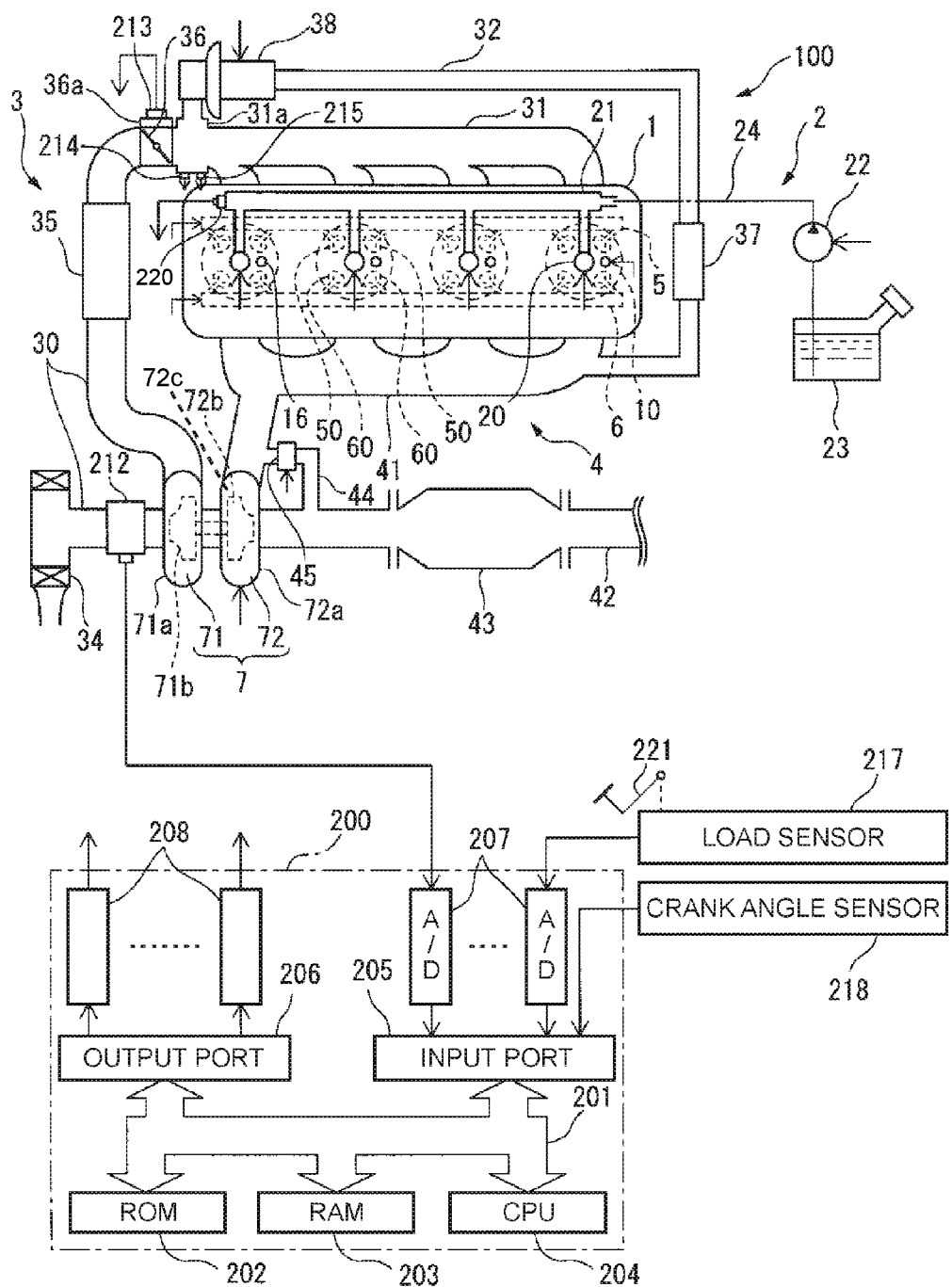
FIG. 1 is a diagram schematically illustrating a configuration of an internal combustion engine and an electronic control unit that controls the internal combustion engine according to a first embodiment of the disclosure.
Figure 2:
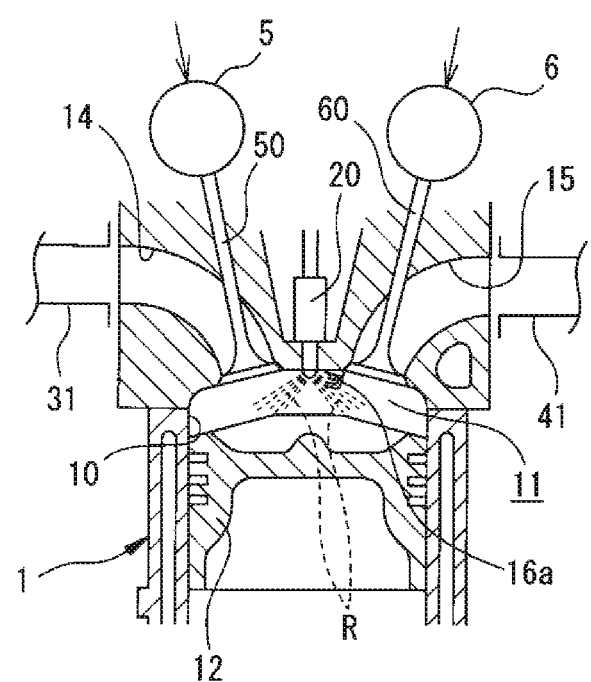
FIG. 2 is a cross-sectional view of an engine body of the internal combustion engine according to the first embodiment of the disclosure.

FIG. 1 is a diagram schematically illustrating configurations of an internal combustion engine 100 and an electronic control unit 200 that controls the internal combustion engine 100 according to a first embodiment of the disclosure. FIG. 2 is a cross-sectional view of an engine body 1 of the internal combustion engine 100.

The internal combustion engine 100 includes an engine body 1 that includes a plurality of cylinders 10, a fuel supply device 2, an intake system 3, an exhaust system 4, an intake valve gear mechanism 5, and an exhaust valve gear mechanism 6.

The engine body 1 combusts fuel in a combustion chamber 11 (see FIG. 2) that is formed in each cylinder 10 and generates power for driving, for example, a vehicle. In the engine body 1, a spark plug 16 is disposed to face the combustion chamber 11 of the cylinder 10 for each cylinder. The engine body 1 is provided with a pair of intake valves 50 and a pair of exhaust valves 60 for each cylinder. As illustrated in FIG. 2, a piston 12 that reciprocates in the cylinder 10 with a combustion pressure is accommodated in each cylinder 10. The piston 12 is connected to a crank shaft via a connecting rod (not shown) and the reciprocating motion of the piston 12 is converted into a rotational motion by the crank shaft.

The fuel supply device 2 includes an electronically controlled fuel injection valve 20, a delivery pipe 21, a supply pump 22, a fuel tank 23, and a pumping pipe 24.

The fuel injection valve 20 is disposed at the top of the center of the combustion chamber 11 and disposed to face the combustion chamber 11 of the cylinder 10 for each cylinder 10. As illustrated in FIG. 2, in this embodiment, the fuel injection valve 20 is disposed adjacent to the spark plug 16 such that an electrode portion 16a of the spark plug 16 is located in the inside of the a fuel injection area R of the fuel injection valve 20 or in the vicinity of the fuel injection area R to perform spray-guided stratified combustion to be described later. A valve opening time (an amount of fuel injected) and a valve opening timing (an injection timing) of the fuel injection valve 20 are changed based on a control signal from the electronic control unit 200, and when the fuel injection valve 20 is opened, fuel is directly injected into the combustion chamber 11 from the fuel injection valve 20.

The delivery pipe 21 is connected to the fuel tank 23 via the pumping pipe 24. In the middle of the pumping pipe 24, the supply pump 22 that pressurizes fuel stored in the fuel tank 23 and supplies the fuel to the delivery pipe 21 is disposed. The delivery pipe 21 temporarily stores high-pressure fuel pumped from the supply pump 22. When the fuel injection valve 20 is opened, the high-pressure fuel stored in the delivery pipe 21 is directly injected into the combustion chamber 11 from the fuel injection valve 20. The delivery pipe 21 is provided with a fuel pressure sensor 211 that detects a fuel pressure in the delivery pipe 21, that is, a pressure of fuel (an injection pressure) injected into the cylinder from the fuel injection valve 20.

The supply pump 22 is configured to change an amount of fuel ejected, and the amount of fuel ejected from the supply pump 22 is changed based on a control signal from the electronic control unit 200. By controlling the amount of fuel ejected from the supply pump 22, the fuel pressure in the delivery pipe 21, that is, the injection pressure of the fuel injection valve 20, is controlled.

The intake system 3 is to guide intake air into the combustion chamber 11 and is configured to change an intake state (an intake air pressure, an intake air temperature, or an amount of external exhaust gas recirculation (EGR) gas) of intake air sucked into the combustion chamber 11. The intake system 3 includes an intake air passage 30, an intake manifold 31, and an EGR passage 32.

One end of the intake air passage 30 is connected to an air cleaner 34, and the other end thereof is connected to an intake air collector 31a of the intake manifold 31. In the intake air passage 30, an air flow meter 212, a compressor 71 of an exhaust turbocharger 7, an intercooler 35, and a throttle valve 36 are disposed sequentially from the upstream side.

The air flow meter 212 detects a flow rate of air (hereinafter referred to as an "actual amount of intake air") which flows into the intake air passage 30 and is sucked into each cylinder 10.

The compressor 71 includes a compressor housing 71a and a compressor wheel 71b that is disposed in the compressor housing 71a. The compressor wheel 71b is rotationally driven by a turbine wheel 72b of the exhaust turbocharger 7 disposed coaxially thereto, and compresses and ejects intake air flowing into the compressor housing 71a.

The intercooler 35 is a heat exchanger that cools intake air, which has been compressed and increased in temperature by the compressor 71, for example, using traveling air or cooling water.

The throttle valve 36 adjusts an amount of intake air which is introduced into the intake manifold 31 by changing a passage cross-sectional area of the intake air passage 30. The throttle valve 36 is opened and closed by a throttle actuator 36a and an opening degree thereof (a throttle opening degree) is detected by a throttle sensor 213.

The intake manifold 31 is connected to an intake port 14 (see FIG. 2) formed in the engine body 1, and uniformly distributes intake air flowing from the intake air passage 30 to the cylinders 10 via the intake port 14. The intake air collector 31a of the intake manifold 31 is provided with an intake air pressure sensor 214 that detects a pressure of intake air (an intake air pressure) sucked into the cylinder and an intake air temperature sensor 215 that detects a temperature of intake air (an intake air temperature) sucked into the cylinder.

The EGR passage 32 is a passage which causes the exhaust manifold 41 and the intake air collector 31a of the intake manifold 31 to communicate with each other and returns a part of exhaust gas discharged from the cylinder 10 to the intake air collector 31a by a pressure difference. Hereinafter, exhaust gas flowing into the EGR passage 32 is referred to as "external EGR gas." The combustion temperature can be decreased to prevent discharging of nitrogen oxide (NOx) by recirculating the external EGR gas to the intake air collector 31a and each cylinder 10. In the EGR passage 32, an EGR cooler 37 and an EGR valve 38 are disposed sequentially form the upstream side.

The EGR cooler 37 is a heat exchanger that cools the external EGR gas, for example, using traveling air or cooling water.

The EGR valve 38 is an electromagnetic valve that can continuously or stepwisely adjust an opening degree, and the opening degree is controlled by the electronic control unit 200 depending on an engine operating state. By controlling the opening degree of the EGR valve 38, the flow rate of the external EGR gas which is recirculated to the intake air collector 31a is adjusted.

The exhaust system 4 is to discharge exhaust gas from the cylinder and to include an exhaust manifold 41, an exhaust gas passage 42, an exhaust gas post-processing device 43, and an exhaust gas bypass passage 44.

The exhaust manifold 41 is connected to an exhaust port 15 which is formed in the engine body 1, and collects and introduces exhaust gas discharged from the cylinder 10 to the exhaust gas passage 42.

In the exhaust gas passage 42, the turbine 72 of the exhaust turbocharger 7 and the exhaust gas post-processing device 43 are disposed sequentially from the upstream side.

The turbine 72 includes a turbine housing 72a and a turbine wheel 72b which is disposed in the turbine housing 72a. The turbine wheel 72b is rotationally driven with energy of exhaust gas flowing into the turbine housing 72a and drives the compressor wheel 71b attached coaxially thereto.

The exhaust gas post-processing device 43 is a device that purifies and discharges exhaust gas to the outside and includes various exhaust gas purification catalysts for removing toxic substances or a filter for collecting toxic substances.

The exhaust gas bypass passage 44 is a passage that is connected to the exhaust gas passage 42 upstream from the turbine 72 and the exhaust gas passage 42 downstream of the turbine 72 to bypass the turbine 72.

The exhaust gas bypass passage 44 is provided with a waste gate valve 45 that is driven by a waste gate actuator (not illustrated) and can continuously or stepwisely adjust a passage cross-sectional area of the exhaust gas bypass passage 44. When the waste gate valve 45 is opened, a part or a whole of exhaust gas flowing in the exhaust gas passage 42 upstream from the turbine 72 flows into the exhaust gas bypass passage 44, bypasses the turbine 72, and is discharged to the outside. Accordingly, by adjusting an opening degree of the waste gate valve 45 (hereinafter referred to as a "waste gate opening degree"), a flow rate of exhaust gas flowing into the turbine 72 can be adjusted to control a rotation speed of the turbine 72. That is, it is possible to control a pressure of air (a supercharging pressure) compressed by the compressor 71 by adjusting the waste gate opening degree.

The intake valve gear mechanism 5 is a device that opens and closes the intake valve 50 of each cylinder 10 and is disposed in the engine body 1. The intake valve gear mechanism 5 according to this embodiment is configured to open the intake valve 50 of each cylinder 10 in an intake stroke. A detailed configuration of the intake valve gear mechanism 5 will be described later with reference to FIGS. 3 and 4.

The exhaust valve gear mechanism 6 is a device that opens and closes the exhaust valve 60 of each cylinder 10 and is disposed in the engine body 1. The exhaust valve gear mechanism 6 according to this embodiment is configured to open the exhaust valve 60 of each cylinder 10 in an exhaust stroke and to open the exhaust valve 60 in an intake stroke if necessary. A detailed configuration of the exhaust valve gear mechanism 6 will be described later with reference to FIGS. 5 and 6.

The electronic control unit 200 is constituted by a digital computer and includes a read only memory (ROM) 202, a random access memory (RAM) 203, a central processing unit (CPU: microprocessor) 204, an input port 205, and an output port 206 which are connected to each other by a bidirectional bus 201.

An output signal of the fuel pressure sensor 211 or the like is input to the input port 205 via a corresponding AD converter 207. An output voltage of a load sensor 217 that generates an output voltage proportional to a depression level of an accelerator pedal 220 (hereinafter referred to as an "accelerator depression level") as a signal for detecting an engine load is input to the input port 205 via the corresponding AD converter 207. An output signal of a crank angle sensor 218 that generates an output pulse whenever the crank shaft of the engine body 1 rotates, for example, by 15 degrees as a signal for calculating an engine rotation speed or the like is input to the input port 205. In this way, output signals of various sensors required for controlling the internal combustion engine 100 are input to the input port 205.

The output port 206 is connected to various control components such as the fuel injection valve 20 via corresponding drive circuits 208.

The electronic control unit 200 outputs control signals for controlling various control components from the output port 206 based on the output signals of various sensors input to the input port 205 to control the internal combustion engine 100.

Figure 3:
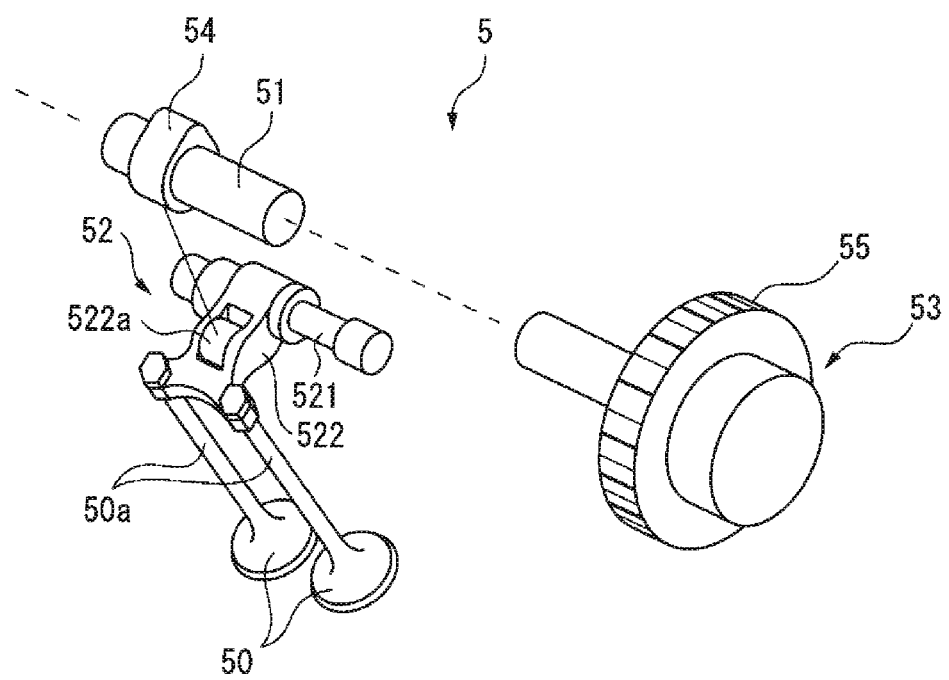
FIG. 3 is a schematic perspective view of an intake valve gear mechanism according to the first embodiment of the disclosure.

FIG. 3 is a schematic perspective view of the intake valve gear mechanism 5 according to this embodiment.

The intake valve gear mechanism 5 includes an intake cam shaft 51 that extends in a cylinder line direction, an intake valve driving mechanism 52 that drives the intake valve 50, and a variable intake phase mechanism 53 that changes a phase of the intake cam shaft 51 (hereinafter referred to as an "intake phase") with respect to the crank shaft.

The intake cam shaft 51 is attached to the engine body 1 to be freely rotatable relative to the engine body 1. The intake cam shaft 51 is linked to the crank shaft with a belt or a chain via a sprocket 55 disposed at one end thereof, and rotates axially along with the crank shaft. An intake cam 54 that rotates along with the intake cam shaft 51 is fixed to the intake cam shaft 51 for each cylinder.

The intake valve driving mechanism 52 includes an intake support shaft 521 and a Y-shaped rocker arm 522.

The intake support shaft 521 is disposed below the intake cam shaft 51, extends in the cylinder line direction parallel to the intake cam shaft 51, and is fixedly supported by the engine body 1.

A tip of the Y-shaped rocker arm 522 bifurcates and the intake support shaft 521 is inserted into a base end thereof to swing (move upward and downward) in a predetermined rotation range about the axis of the intake support shaft 521. A stem portion 50a of the intake valve 50 is fixed to the tip of the Y-shaped rocker arm 522 which bifurcates. The Y-shaped rocker arm 522 includes a needle roller 522a in sliding contact with the intake cam 54 at the central portion thereof, and when the intake cam shaft 51 rotates along with the crank shaft, the needle roller 522a is pressed by the intake cam 54. Accordingly, the Y-shaped rocker arm 522 swings in the predetermined rotation range about the axis of the intake support shaft 521 to open the intake valve 50.

The variable intake phase mechanism 53 is disposed at one end of the intake cam shaft 51. The variable intake phase mechanism 53 will be described below with additional reference to FIG. 4.

Figure 4:
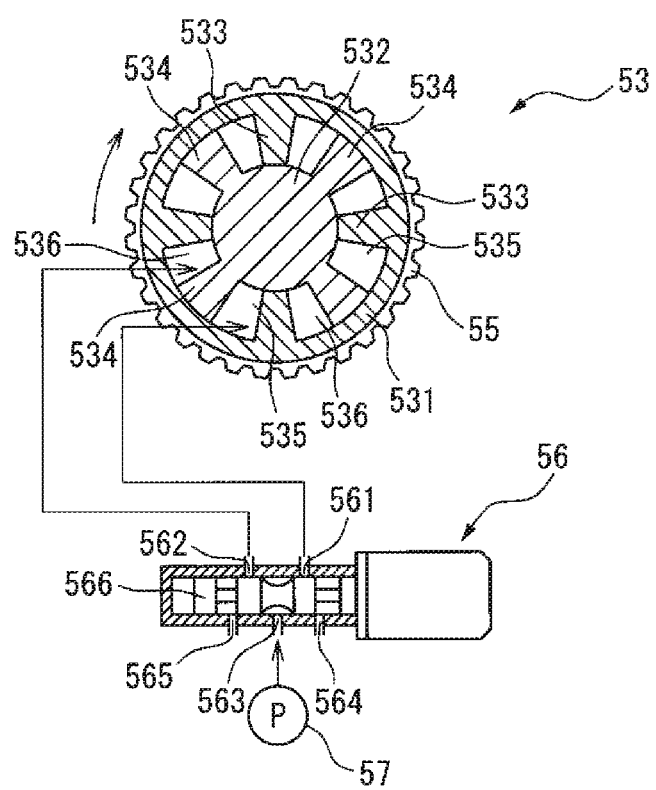
FIG. 4 is a schematic cross-sectional view of a variable intake phase mechanism according to the first embodiment of the disclosure.

FIG. 4 is a schematic cross-sectional view of the variable intake phase mechanism 53.

As illustrated in FIG. 4, the variable intake phase mechanism 53 includes a cylindrical housing 531, a rotation shaft 532, a plurality of partition walls 533, a vane 534, an advance oil pressure chamber 535, a delay oil pressure chamber 536, and a hydraulic oil supply control valve 56. The cylindrical housing 531 rotates along with the sprocket 55. The rotation shaft 532 rotates along with the intake cam shaft 51 and can rotate relative to the cylindrical housing 531. The plurality of partition walls 533 extend from the inner circumferential surface of the cylindrical housing 531 to the outer circumferential surface of the rotation shaft 532. The vane 534 extends from the outer circumferential surface of the rotation shaft 532 to the inner circumferential surface of the cylindrical housing 531 between the partition walls 533. The advance oil pressure chamber 535 and the delay oil pressure chamber 536 are formed on both sides of each vane 534. The hydraulic oil supply control valve 56 performs control of distribution of hydraulic oil for the advance oil pressure chamber 535 and the delay oil pressure chamber 536.

The hydraulic oil supply control valve 56 includes an advance oil pressure port 561 that is connected to the advance oil pressure chamber 535, a delay oil pressure port 562 that is connected to the delay oil pressure chamber 536, a supply port 563 that is supplied with hydraulic oil ejected from a hydraulic pump 57, a first drain port 564, a second drain port 565, and a spool valve 566 that performs communication interception control between the ports (such as the advance oil pressure port 561, the delay oil pressure port 562, the supply port 563, the first drain port 564, and the second drain port 565).

When the intake phase is advanced, the spool valve 566 moves to right in FIG. 4, the hydraulic oil supplied from the supply port 563 is supplied to the advance oil pressure chamber 535 via the advance oil pressure port 561. The hydraulic oil in the delay oil pressure chamber 536 is discharged from the second drain port 565. At this time, the rotation shaft 532 rotates in the arrow direction relative to the cylindrical housing 531.

On the other hand, when the intake phase is delayed, the spool valve 566 moves to left in FIG. 4, the hydraulic oil supplied from the supply port 563 is supplied to the delay oil pressure chamber 536 via the delay oil pressure port 562. The hydraulic oil in the advance oil pressure chamber 535 is discharged from the first drain port 564. At this time, the rotation shaft 532 rotates in the opposite direction of the arrow direction relative to the cylindrical housing 531.

When the rotation shaft 532 rotates relative to the cylindrical housing 531 and the spool valve 566 is returned to a neutral position in FIG. 4, the relative rotation of the rotation shaft 532 is stopped and the rotation shaft 532 is maintained at the relative rotational position at that time. In this way, the intake phase can be advanced or delayed by a desired quantity using the variable intake phase mechanism 53.

Figure 5:
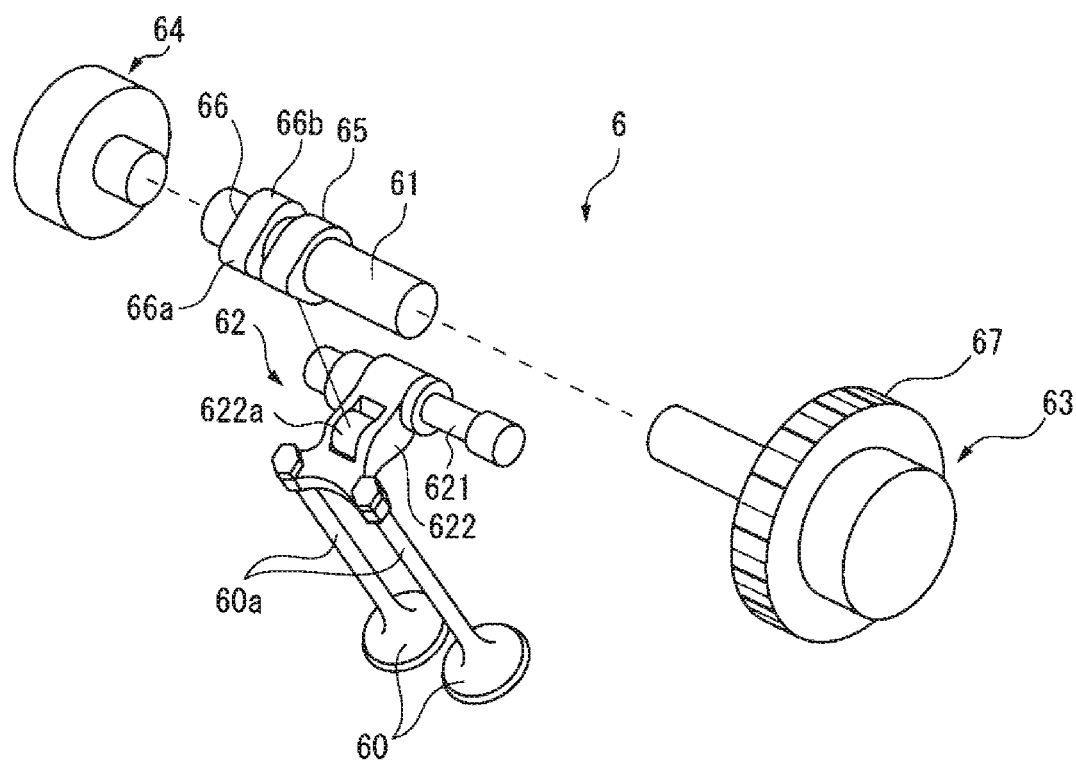
FIG. 5 is a schematic perspective view of an exhaust valve gear mechanism according to the first embodiment of the disclosure.

FIG. 5 is a schematic perspective view of the exhaust valve gear mechanism 6 according to this embodiment.

The exhaust valve gear mechanism 6 includes an exhaust cam shaft 61 that extends in the cylinder line direction, an exhaust valve driving mechanism 62 that drives the exhaust valve 60, a variable exhaust phase mechanism 63 that changes a phase of the exhaust cam shaft 61 (hereinafter referred to as an "exhaust phase") with respect to the crank shaft, and a characteristic switching mechanism 64 that can switch a lift characteristic of the exhaust valve 60 between a first lift characteristic of opening the exhaust valve 60 in an exhaust stroke and a second lift characteristic of opening the exhaust valve 60 in an exhaust stroke and an intake stroke.

The exhaust cam shaft 61 is attached to the engine body 1 to be freely rotatable relative to the engine body 1. The exhaust cam shaft 61 is linked to the crank shaft with a belt or a chain via a sprocket 67 disposed at one end thereof, and rotates axially along with the crank shaft.

A first exhaust cam 65 and a second exhaust cam 66 that rotate along with the exhaust cam shaft 61 are fixed to the exhaust cam shaft 61 for each cylinder. The first exhaust cam 65 is a cam that opens the exhaust valve 60 of each cylinder 10 in an exhaust stroke. The second exhaust cam 66 is a cam that opens the exhaust valve 60 of each cylinder 10 in an exhaust stroke and an intake stroke. The second exhaust cam 66 includes a cam ridge 66a that opens the exhaust valve 60 in the exhaust stroke and a cam ridge 66b that opens the exhaust valve 60 in the intake stroke. The cam ridge 66a and the cam ridge 66b of the second exhaust cam 66 are formed such that a lift level of the exhaust valve 60 in the intake stroke is smaller than the lift level of the exhaust valve 60 in the exhaust stroke.

The exhaust valve driving mechanism 62 includes an exhaust support shaft 621 and a Y-shaped rocker arm 622.

The exhaust support shaft 621 is disposed below the exhaust cam shaft 61, extends in the cylinder line direction in parallel to the exhaust cam shaft 61, and is fixedly supported by the engine body 1.

A tip of the Y-shaped rocker arm 622 bifurcates and the exhaust support shaft 621 is inserted into a base end thereof to swing in a predetermined rotation range about the axis of the exhaust support shaft 621. A stem portion 60a of the exhaust valve 60 is fixed to the tip of the Y-shaped rocker arm 622 which bifurcates. The Y-shaped rocker arm 622 includes a needle roller 622a in sliding contact with one of the first exhaust cam 65 and the second exhaust cam 66 depending on a switching state of the characteristic switching mechanism 64 at the central portion thereof, and when the exhaust cam shaft 61 rotates along with the crank shaft, the needle roller 622a is pressed by one of the first exhaust cam 65 and the second exhaust cam 66 depending on the switching state of the characteristic switching mechanism 64. Accordingly, the Y-shaped rocker arm 622 swings in the predetermined rotation range about the axis of the exhaust support shaft 621 to open the exhaust valve 60.

The variable exhaust phase mechanism 63 is disposed at one end of the exhaust cam shaft 61. The configuration of the variable exhaust phase mechanism 63 is the same as the variable intake phase mechanism 53 and thus description thereof will not be repeated. The exhaust phase can be advanced or delayed by a desired quantity by the variable exhaust phase mechanism 63.

The characteristic switching mechanism 64 is disposed at the other end of the exhaust cam shaft 61. The characteristic switching mechanism 64 will be described below with additional reference to FIG. 6.

Figure 6:
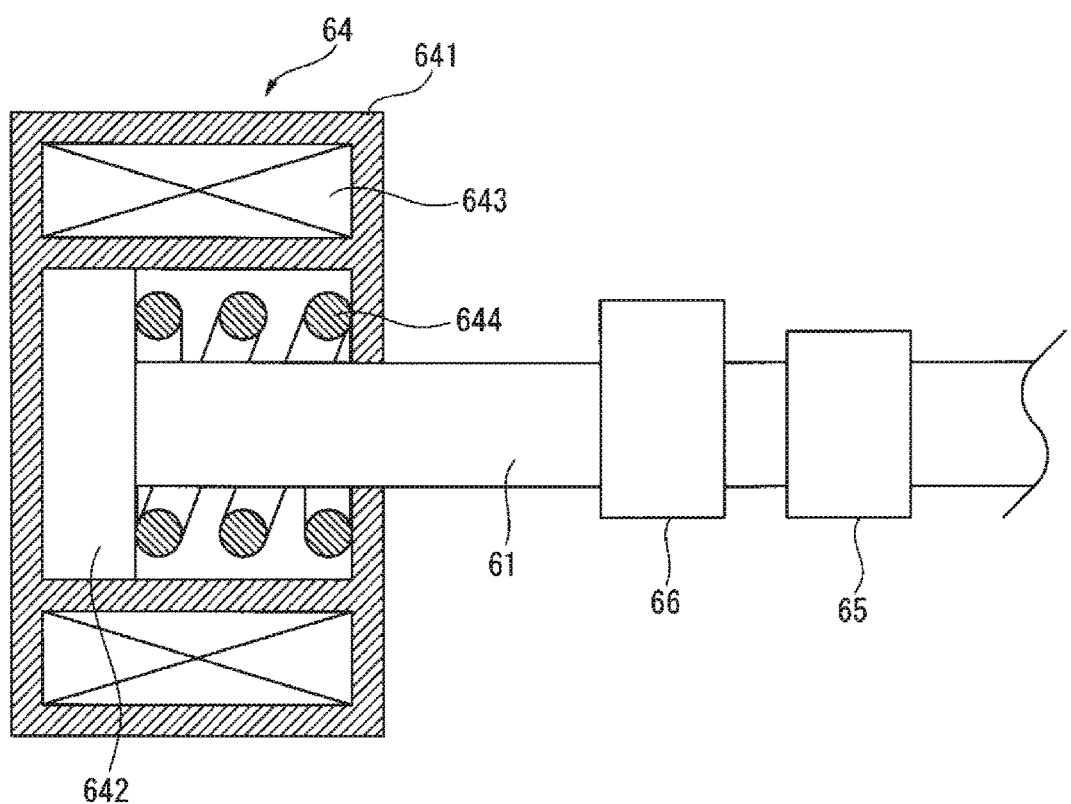
FIG. 6 is a schematic cross-sectional view of a characteristic switching mechanism according to the first embodiment of the disclosure.

FIG. 6 is a schematic cross-sectional view of the characteristic switching mechanism 64.

The characteristic switching mechanism 64 includes a cylindrical housing 641, a slider 642, an electromagnet 643, and a coil spring 644.

The cylindrical housing 641 is a housing which is disposed at the other end of the exhaust cam shaft 61 and accommodates the slider 642, the electromagnet 643, the coil spring 644, and a part of the exhaust cam shaft 61.

The slider 642 is disposed at the other end of the exhaust cam shaft 61 and rotates along with the exhaust cam shaft 61. The slider 642 is formed of a magnetic substance. The slider 642 is accommodated in the cylindrical housing 641 to move to one end (to right in the drawing) in the axial direction of the exhaust cam shaft 61 along with the exhaust cam shaft 61 against a spring force of the coil spring 644 when an excitation current flows in the electromagnet 643.

The electromagnet 643 is disposed around the slider 642. The excitation current in the electromagnet 643 is controlled by the electronic control unit 200.

The coil spring 644 is disposed in the cylindrical housing 641 with a length shorter than a natural length thereof, and normally presses the slider 642 to the other end (to left in the drawing) in the axial direction of the exhaust cam shaft 61.

Control of the internal combustion engine 100 which is performed by the electronic control unit 200 will be described below.

The electronic control unit 200 switches an operation mode of the engine body 1 to any one of a spark ignition operation mode (hereinafter referred to as an "SI operation mode") and a compression ignition operation mode (hereinafter referred to as a "CI operation mode") based on an engine operating state (an engine rotation speed and an engine load).

Specifically, the electronic control unit 200 switches the operation mode to the CI operation mode when the engine operating state is in a compression ignition operation range (hereinafter referred to as a "CI operation range") which are surrounded with a solid line in FIG. 7. The electronic control unit 200 switches the operation mode to the SI operation mode when the engine operating state is in a spark ignition operation range (hereinafter referred to as an "SI operation range") other than the CI operation range. The electronic control unit 200 performs control of the engine body 1 based on the operation modes.

As illustrated in FIG. 7, in this embodiment, supercharging is performed in an operation range on a higher load side in the CI operation range, and supercharging is performed in an operation range on a higher load side in the SI operation range. In the following description, when a range in which supercharging is performed and a range in which supercharging is not performed need to be particularly distinguished from each other, the operation ranges in which supercharging is performed in the CI operation range and the SI operation range are referred to as a "supercharging CI operation range" and a "supercharging SI operation range," respectively. The operation ranges in which supercharging is not performed in the CI operation range and the SI operation range are referred to as a "natural intake CI operation range" and a "natural intake SI operation range," respectively.

When the operation mode is the SI operation mode, the electronic control unit 200 forms a homogeneous air-fuel pre-mixture at a stoichiometric air-fuel ratio or at the vicinity of the stoichiometric air-fuel ratio in the combustion chamber 11 by basically injecting fuel in an intake stroke, ignites the air-fuel pre-mixture using the spark plug 16, and combusts the air-fuel pre-mixture by flame propagation combustion to operate the engine body 1. That is, when the operation mode is the SI operation mode, the electronic control unit 200 performs homogeneous combustion of igniting fuel which is uniformly diffused into the combustion chamber 11 using the spark plug 16 and combusting the fuel by flame propagation combustion.

When the operation mode is the CI operation mode, the electronic control unit 200 forms an air-fuel pre-mixture at an air-fuel ratio (for example, 30 to 40) which is leaner than the stoichiometric air-fuel ratio in the combustion chamber 11 by basically injecting fuel in a compression stroke and combusts the air-fuel pre-mixture by compression ignition combustion to operate the engine body 1. That is, the pre-mixture compression ignition combustion is Premixed Charge Compression Ignition (PCCI).

The pre-mixture compression ignition combustion can be performed even when the air-fuel ratio is leaner than in the flame propagation combustion, and can be performed when the compression ratio is higher than in the flame propagation combustion. Accordingly, by performing the pre-mixture compression ignition combustion, it is possible to improve fuel efficiency and to improve thermal efficiency. Since the pre-mixture compression ignition combustion is lower in combustion temperature than the flame propagation combustion, it is possible to prevent production of NOx. Since sufficient oxygen is present around fuel, it is possible to prevent production of unburned HC.

When it is intended to perform the pre-mixture compression ignition combustion, the cylinder temperature needs to be increased to a temperature at which an air-fuel pre-mixture can be self-ignited and the cylinder temperature needs to be set to a higher temperature than when the air-fuel pre-mixture is combusted in the combustion chamber 11 by flame propagation combustion as in the SI operation mode.

Figure 8A:
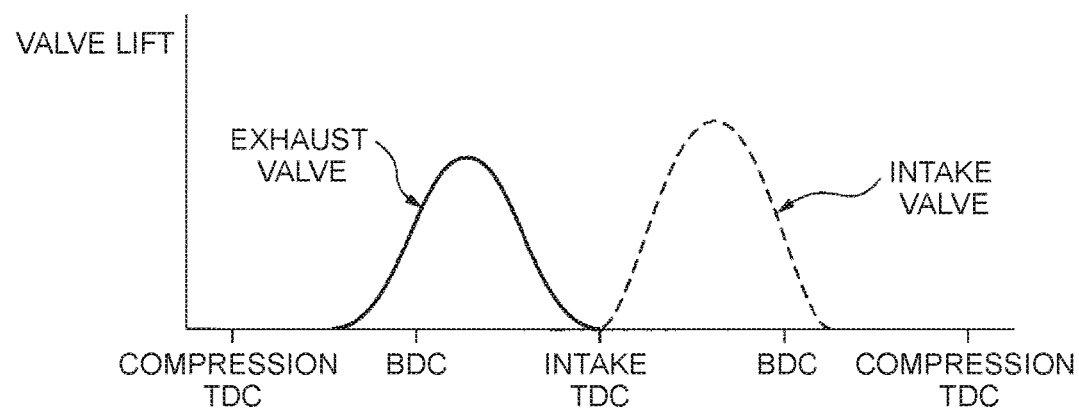
FIG. 8A is a diagram illustrating an example of valve opening operations of an intake valve and an exhaust valve in an SI operation mode.
Figure 8B:
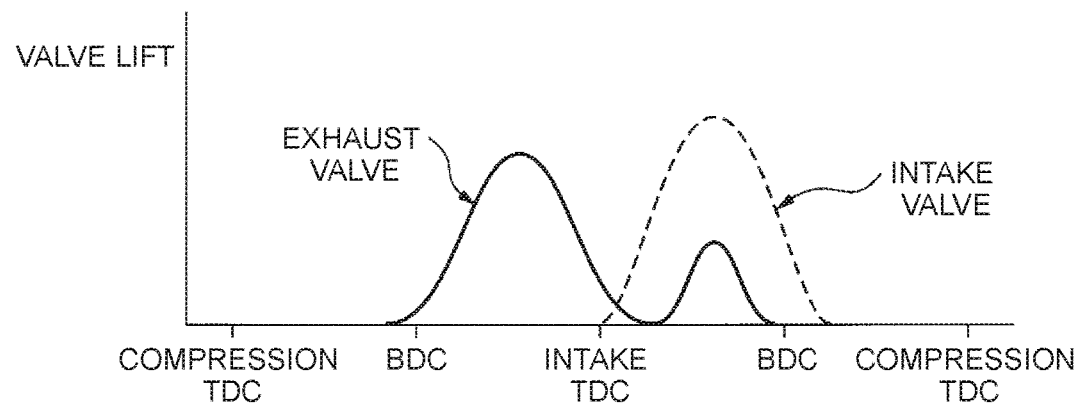
FIG. 8B is a diagram illustrating an example of valve opening operations of the intake valve and the exhaust valve in a CI operation mode.

Therefore, in this embodiment, in the SI operation mode, the lift characteristic of the exhaust valve 60 is switched to the first lift characteristic by the characteristic switching mechanism 64 to open the exhaust valve 60 in only the exhaust stroke, as illustrated in FIG. 8A, As illustrated in FIG. 8B, in the CI operation mode, the lift characteristic of the exhaust valve 60 is switched to the second lift characteristic by the characteristic switching mechanism 64 to open the exhaust valve 60 in the intake stroke in addition to the exhaust stroke. By performing an exhaust valve twice-opening operation of opening the exhaust valve 60 again in the intake stroke, high-temperature exhaust gas discharged from a cylinder in the exhaust stroke can be sucked back into the cylinder in a subsequent intake stroke. In the CI operation mode, the cylinder temperature is increased by performing the exhaust valve twice-opening operation, and the cylinder temperature of each cylinder 10 is maintained at a temperature at which the pre-mixture compression ignition combustion can be performed. In the following description, for the purpose of distinguishment from the external EGR gas, exhaust gas sucked back into the cylinder by the exhaust valve twice-opening operation is referred to as "internal EGR gas."

In this way, in this embodiment, the lift characteristic of the exhaust valve 60 is switched to the first lift characteristic by the characteristic switching mechanism 64 in the SI operation mode. In the CI operation mode, the lift characteristic of the exhaust valve 60 is switched to the second lift characteristic by the characteristic switching mechanism 64.

In this embodiment, in the CI operation mode, the exhaust valve twice-opening operation is performed by switching the lift characteristic of the exhaust valve 60 to the second lift characteristic in all the operation ranges of the CI operation range, but when the exhaust valve twice-opening operation is performed in the operation range on a higher load side in the CI operation range, the cylinder temperature may be excessively increased. In this case, the exhaust valve twice-opening operation may be performed by switching the lift characteristic of the exhaust valve 60 to the second lift characteristic in only a partial operation range on low and middle load sides in the CI operation range. In the following description, an operation range in which the exhaust valve twice-opening operation is performed when switching failure has not occurred (hereinafter referred to as a "normal state") is referred to as a "first operation range" if necessary. On the other hand, an operation range in which the exhaust valve twice-opening operation is not performed in the normal state is referred to as a "second operation range" if necessary. Accordingly, in this embodiment, as illustrated in FIG. 7, the whole operation range in the CI operation range is the first operation range and the whole operation range in the SI operation range is the second operation range.

There is concern that failure (hereinafter referred to as "switching failure") in which the lift characteristic of the exhaust valve 60 cannot be switched to the first lift characteristic after being switched to the second lift characteristic for a certain reason such as when the spring force of the coil spring 644 that biases the slider 642 to the other end in the axial direction of the exhaust cam shaft 61 is weakened due to degradation of the coil spring 644 or the like or when wires are short-circuited and the excitation current continuously flows in the electromagnet 643 will occur in the characteristic switching mechanism 64.

When the switching failure has occurred, the following problem occurs in the second operation range in which the exhaust valve twice-opening operation is not performed in the normal state.

That is, when the whole operation range in the SI operation range is the second operation range as in this embodiment and the switching failure has occurred to perform the exhaust valve twice-opening operation in the SI operation mode, the cylinder temperature may be excessively increased and there is concern that pre-ignition in which an air-fuel pre-mixture is self-ignited before being ignited by the spark plug 16 will occur. In the SI operation mode, a homogeneous air-fuel pre-mixture is formed in the whole combustion chamber 11 and is combusted by flame propagation combustion. Accordingly, when the cylinder temperature is excessively increased, an unburned air-fuel pre-mixture (end gas) present around the inner wall surface of the cylinder 10 may be pressed against the piston 12 or the inner wall surface of the cylinder 10 during the flame propagation after being ignited by the spark plug 16, and there is concern that knocking in which the end gas is self-ignited will occur.

When a partial operation range on a high load side in the CI operation range in addition to the whole operation range in the SI operation is the second operation range, the cylinder temperature in the partial operation range on the high load side in the CI operation range is excessively increased. Accordingly, there is concern that an air-fuel pre-mixture will cause early self-ignition before the normal self-ignition timing.

in this way, when the exhaust valve twice-opening operation is performed in the second operation range in which the exhaust valve twice-opening operation is not performed in the normal state, there is concern that abnormal combustion such as pre-ignition, knocking, or early self-ignition will occur intermittently or continuously and there is concern that the engine body 1 will degrade.

When switching failure has occurred and the exhaust valve twice-opening operation is performed in the SI operation mode, a large amount of exhaust gas is sucked back into the cylinder 10 and thus there is concern that homogenization of an air-fuel pre-mixture is not achieved, combustion is destabilized, and misfiring is caused, for example, due to stopping of flame propagation.

Therefore, in this embodiment, when switching failure has occurred and the engine operating state is in the second operation range in which the exhaust valve twice-opening operation is not performed in the normal state, the operation mode is switched to an operation mode for fail safe (for saving travel). Specifically, the operation mode is switched to a spray-guided spark ignition operation mode (hereinafter referred to as an "SGSI operation mode").

The SGSI operation mode is an operation mode in which the engine body 1 operates by performing stratified combustion in which a stratified air-fuel mixture is formed in the vicinity of the electrode portion 16a of the spark plug 16 by so-called spray guide and the stratified air-fuel mixture is combusted by flame propagation combustion (hereinafter referred to as "spray-guided stratified combustion").

The spray guide is a technique for forming a stratified air-fuel mixture including a combustible layer and an air layer and performing stratified combustion, and wall guide or air guide in addition to spray guide is known as the technique for forming a stratified air-fuel mixture and performing stratified combustion.

The wall guide is a technique of injecting fuel to a cavity formed on a piston crown surface, guiding fuel to the vicinity of the spark plug 16 using the cavity, and partially forming a combustible layer in the vicinity of the spark plug 16 to form a stratified air-fuel mixture.

The air guide is a technique of guiding fuel injected from the fuel injection valve 20 to the vicinity of the spark plug 16 using a gas flow of intake air sucked into the combustion chamber 11 when the intake valve 50 is opened, and forming a combustible layer in the vicinity of the spark plug 16 to form a stratified air-fuel mixture.

On the other hand, in the spray guide, without using the cavity or the gas flow of intake air, the spark plug 16 is disposed such that the electrode portion 16a of the spark plug 16 is located in the inside of a fuel injection area R or the vicinity of the fuel injection area R of the fuel injection valve 20. Then, a stratified air-fuel mixture is formed using a combustible layer which is temporarily formed in the vicinity of the electrode portion 16a of the spark plug 16 before fuel is diffused to the whole combustion chamber 11 by directly injecting fuel to a space in the vicinity of the electrode portion 16a of the spark plug 16.

When stratified combustion is performed using the wall guide or the air guide, fuel injected from the fuel injection valve 20 needs to be guided to the vicinity of the electrode portion 16a of the spark plug 16 using the cavity or the gas flow of intake air. Accordingly, a predetermined time interval is required until a stratified air-fuel mixture is formed after fuel is injected. Accordingly, it is necessary to perform ignition after the predetermined time elapses after fuel is injected and thus a predetermined time interval is present between a fuel injection timing and an ignition timing. Fuel injection needs to be performed while the piston 12 is located at a predetermined position or until the gas flow of intake air is attenuated, and thus the fuel injection timing is limited.

On the other hand, in the spray-guided stratified combustion, fuel is directly injected to a space in the vicinity of the electrode portion 16a of the spark plug 16 without using the cavity or the gas flow of intake air. Accordingly, stratified combustion is performed by igniting a combustible layer (a stratified air-fuel mixture) which is temporarily formed in the vicinity of the electrode portion 16*a* of the spark plug 16 before fuel is diffused to the whole combustion chamber 11. Accordingly, since the fuel injection timing does not depend on the piston position or the like, fuel injection can be performed at an arbitrary timing in a range in which a stratified air-fuel mixture can be formed. Since the time interval until a stratified air-fuel mixture is formed after fuel is injected is very short, it is possible to ignite the stratified air-fuel mixture almost at the same timing as the fuel injection timing.

That is, when the spray-guided stratified combustion is performed, the fuel injection timing can be more freely set in the range in which the stratified air-fuel mixture can be formed, in comparison with a case in which stratified combustion is performed using the wall guide or the air guide. The time interval from the fuel injection timing to the ignition timing can be shortened.

Here, the fuel injected into the combustion chamber 11 gradually causes various chemical reactions with an increase in the cylinder temperature and the cylinder pressure and reaches self-ignition. Accordingly, a certain time is required until fuel is self-ignited.

Accordingly, when switching failure has occurred, the time interval from the fuel injection timing to the ignition timing can be shortened by performing the spray-guided stratified combustion in the second operation range in which the exhaust valve twice-opening operation is not performed in the normal state (the SI operation range in this embodiment). As a result, it is possible to perform ignition before self-ignition and to prevent occurrence of pre-ignition.

As described above, the spray-guided stratified combustion is to perform stratified combustion by igniting the combustible layer (a stratified air-fuel mixture) which is temporarily formed in the vicinity of the electrode portion 16*a* of the spark plug 16 before fuel is diffused to the whole combustion chamber 11. Accordingly, a stratified air-fuel mixture including a combustible layer in the central portion in the combustion chamber 11 and an air layer around the inner wall surface of the cylinder 10 can be formed. As a result, since an unburned air-fuel mixture is not basically present around the inner wall surface of the cylinder 10, it is also possible to prevent occurrence of knocking.

Even in a situation in which a large amount of exhaust gas is sucked back into the cylinder 10, homogenization of an air-fuel pre-mixture is not achieved, and flame propagation combustion is destabilized, it is possible to stabilize combustion by performing stratified combustion of igniting a combustible layer which is partially formed in the combustion chamber 11. Accordingly, it is possible to prevent occurrence of misfiring.

A variety of control which is performed by the electronic control unit 200 will be described below.

Figure 9:
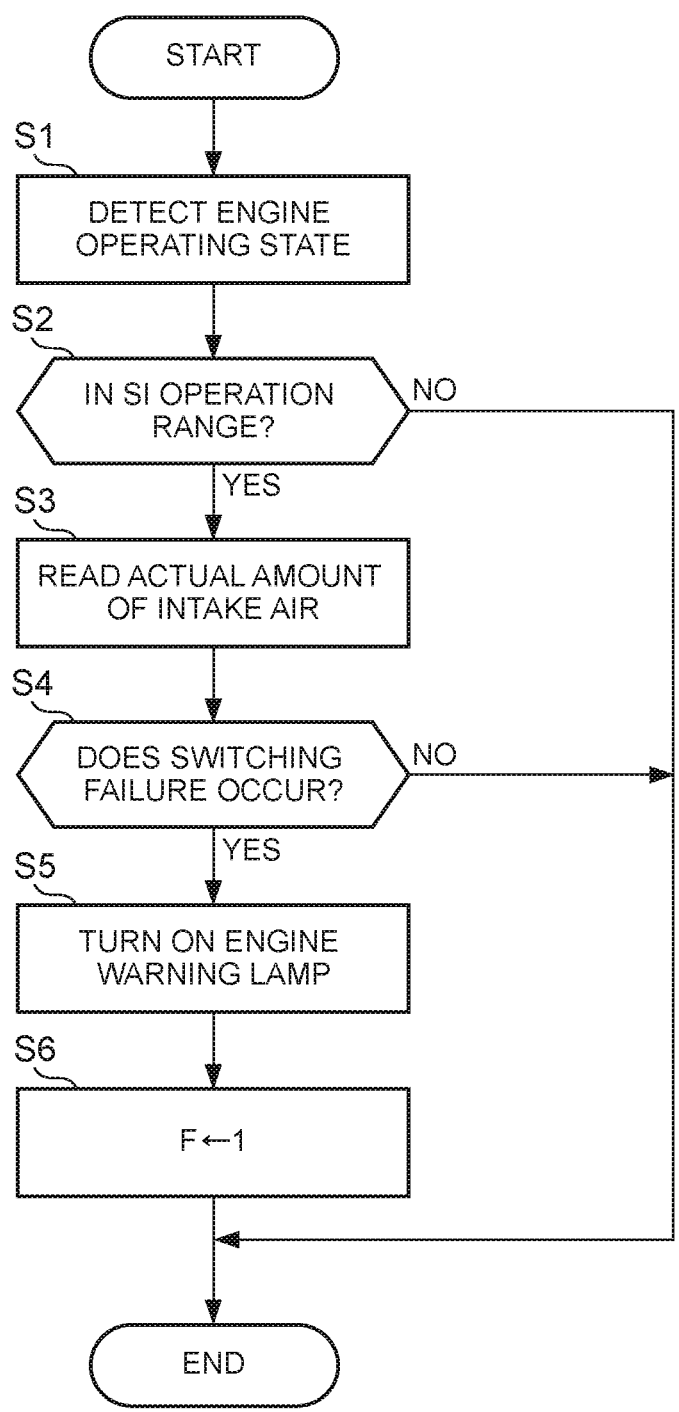
FIG. 9 is a flowchart illustrating switching failure determination control for determining whether switching failure has occurred.

FIG. 9 is a flowchart illustrating switching failure determination control for determining whether switching failure has occurred. The electronic control unit 200 repeatedly performs this routine with a predetermined calculation cycle during operation of an engine.

In Step S1, the electronic control unit 200 reads an engine rotation speed which is calculated based on an output signal of a crank angle sensor 218 and an engine load which is detected by a load sensor 217 and detects an engine operating state.

In Step S2, the electronic control unit 200 determines whether the engine operating state is in the SI operation range. When the engine operating state is in the SI operation range, the electronic control unit 200 performs the process of Step S3. On the other hand, when the engine operating state is in the CI operation range, the electronic control unit 200 ends this routine.

In Step S3, the electronic control unit 200 reads an actual amount of intake air which is detected by the air flow meter 212.

In Step S4, the electronic control unit 200 determines whether switching failure has occurred. Specifically, the electronic control unit 200 determines that switching failure has occurred, when a difference value obtained by subtracting the actual amount of intake air from a target amount of intake air which is predetermined depending on the engine load is equal to or greater than a predetermined threshold value. The reason why it can be determined whether switching failure has occurred using this method is that when switching failure has occurred, the actual amount of intake air is less than the target amount of intake air by an amount of exhaust gas which is sucked back in the intake stroke by the exhaust valve twice-opening operation. The electronic control unit 200 performs the process of Step S5 when switching failure has occurred. On the other hand, the electronic control unit 200 ends this routine when switching failure has not occurred.

The method of determining whether switching failure has occurred is not limited to the above-mentioned method. For example, in a case in which a knocking sensor or a cylinder pressure sensor is disposed, when knocking occurs in a predetermined period after the engine operating state changes from the CI operation range to the SI operation range and the operation mode is switched to the SI operation mode, it may be determined that switching failure has occurred.

In Step S5, the electronic control unit 200 turns on an engine warning lamp (MIL) to promote a driver to repair the characteristic switching mechanism 64.

In Step S6, the electronic control unit 200 sets a switching failure determination flag F to 1. The switching failure determination flag F is a flag of which the initial value is set to 0, and is a flag which is set to 1 when it is determined that switching failure has occurred. The switching failure determination flag F is reset to 0, for example, when repairing of the characteristic switching mechanism 64 is completed.

Figure 10:
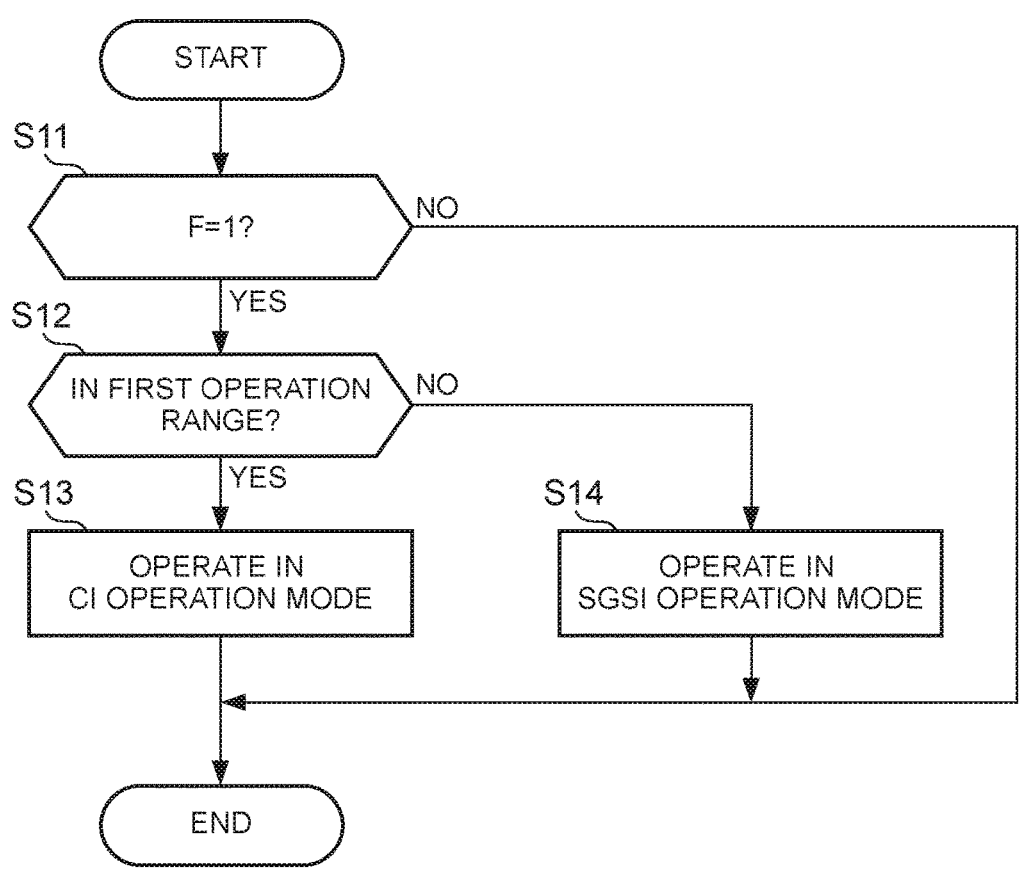
FIG. 10 is a flowchart illustrating combustion control according to the first embodiment of the disclosure when switching failure has occurred.

FIG. 10 is a flowchart illustrating combustion control when switching failure has occurred. The electronic control unit 200 repeatedly performs this routine with a predetermined calculation cycle during operation of an engine.

In Step S11, the electronic control unit 200 determines whether the switching failure determination flag F is set to 1. When the switching failure determination flag F is set to 1, the electronic control unit 200 performs the process of Step S12. On the other hand, when the switching failure determination flag F is set to 0, the electronic control unit 200 ends this routine.

In Step S12, the electronic control unit 200 determines whether the engine operating state is in the first operation range in which the exhaust valve twice-opening operation is performed (in the CI operation range in this embodiment). The electronic control unit 200 performs the process of Step S13 when the engine operating state in the first operation range. On the other hand, the electronic control unit 200 performs the process of Step S14 when the engine operating state is not in the first operation range.

In Step S13, the electronic control unit 200 switches the operation mode to the CI operation mode and operates the engine body 1.

In Step S14, the electronic control unit 200 switches the operation mode to the SGSI operation mode instead of the SI operation mode and operates the engine body 1.

According to the above-mentioned embodiment, the internal combustion engine includes the engine body 1, the combustion chamber 11, the fuel injection valve 20, the spark plug 16, the characteristic switching mechanism 64, and the electronic control unit 200. The fuel injection valve 20 is configured to directly inject fuel into the combustion chamber 11. The electrode portion 16a of the spark plug 16 is disposed in one of the inside of the fuel injection path and the vicinity of the fuel injection path. The characteristic switching mechanism 64 is configured to switch the lift characteristic between the first lift characteristic and the second lift characteristic. The first lift characteristic is a lift characteristic of the exhaust valve 60 of opening the exhaust valve 60 in the exhaust stroke. The second lift characteristic is a lift characteristic of the exhaust valve 60 of opening the exhaust valve 60 in the exhaust stroke and the intake stroke. The electronic control unit 200 is configured to control the fuel injection valve 20 and the spark plug 16 to combust fuel by one of pre-mixture compression ignition combustion and flame propagation combustion. The electronic control unit 200 is configured to switch the lift characteristic of the exhaust valve 60 to the second lift characteristic using the characteristic switching mechanism 64 in a predetermined first operation range. The predetermined first operation range includes at least a part of a compression ignition operation range. The compression ignition operation range is a range in which fuel is combusted by the pre-mixture compression ignition combustion. The electronic control unit 200 is configured to switch the lift characteristic of the exhaust valve 60 to the first lift characteristic using the characteristic switching mechanism 64 in a predetermined second operation range. The predetermined second operation range includes at least a flame ignition operation range. The flame ignition operation range is a range in which fuel is combusted by the flame propagation combustion. The electronic control unit 200 is configured to determine whether switching failure has occurred. The switching failure is failure in which the lift characteristic of the exhaust valve 60 is not switchable from the second lift characteristic to the first lift characteristic using the characteristic switching mechanism 64. The electronic control unit 200 is configured to perform homogeneous combustion in the flame ignition operation range when the switching failure has not occurred. The homogeneous combustion is combustion in which fuel homogeneously diffused into the combustion chamber 11 is ignited using the spark plug 16 and is combusted by the flame propagation combustion. The electronic control unit 200 is configured to perform spray-guided stratified combustion in the second operation range when the switching failure has occurred. The spray-guided stratified combustion is combustion in which fuel in the fuel injection path is ignited using the spark plug 16 and is combusted by the flame propagation combustion.

When switching failure has occurred in this way, it is possible to shorten the time interval from the fuel injection timing to the ignition timing by performing the spray-guided stratified combustion in the second operation range in which the lift characteristic of the exhaust valve 60 is switched to the first lift characteristic in the normal state. Accordingly, it is possible to perform ignition before self-ignition is performed and to prevent occurrence of pre-ignition. When the second operation range includes an operation range on a high load side in the CI operation range, it is possible to prevent occurrence of early self-ignition in which the air-fuel pre-mixture is self-ignited before the normal self-ignition timing.

By performing the spray-guided stratified combustion, it is possible to form a stratified air-fuel mixture including a combustible layer at the central portion of the combustion chamber 11 and an air layer around the inner wall surface of the cylinder 10 can be formed. Accordingly, since an unburned air-fuel mixture is not basically present around the inner wall surface of the cylinder 10, it is possible to prevent occurrence of knocking.

Even in a situation in which a large amount of exhaust gas is sucked back into the cylinder 10, the air-fuel pre-mixture is not homogenized, and combustion is destabilized, since stability of combustion can be achieved by performing the stratified combustion, it is possible to prevent occurrence of misfiring.

A second embodiment of the disclosure will be described below. In this embodiment, when switching failure has occurred, the operation mode is switched to the SGSI operation mode in the second operation range in which the exhaust valve twice-opening operation is not performed in the normal state, and control different from that in the normal state is performed on the throttle valve 36 and the waste gate valve 45. The differences will be mainly described below.

In the first embodiment, when switching failure has occurred, abnormal combustion or occurrence of misfiring is prevented by performing spray-guided stratified combustion in the second operation range in which the exhaust valve twice-opening operation is not performed in the normal state. However, when an amount of internal EGR gas increases, there is concern that abnormal combustion or occurrence of misfiring may not be satisfactorily prevented even when spray-guided stratified combustion is performed.

Therefore, in this embodiment, when switching failure has occurred, the spray-guided stratified combustion is performed in the second operation range in which the exhaust valve twice-opening operation is not performed in the normal state (in the SI operation range in this embodiment) and control for decreasing an amount of internal EGR gas (hereinafter referred to as "internal EGR gas decreasing control") is also performed.

Specifically, in order to decrease intake resistance and to enhance intake efficiency, the throttle valve 36 is controlled such that the throttle opening degree is a maximum opening degree regardless of the engine load. Accordingly, in the natural intake SI operation range in which the throttle opening degree is controlled to a target opening degree lower than the maximum opening degree based on the engine load, an amount of intake air introduced as new air into the combustion chamber 11 via the intake port 14 in the intake stroke can be increased. Accordingly, even when the exhaust valve 60 is opened in the intake stroke in the natural intake SI operation range, the amount of exhaust gas which is sucked back into the combustion chamber 11 via the exhaust port 15 can be decreased by an amount corresponding to the increase in the amount of intake air and it is thus possible to decrease the amount of internal EGR gas. When the engine operating state is in the supercharging SI operation range, the electronic control unit 200 controls the throttle valve 36 such that the throttle opening degree is the maximum opening degree in the normal state.

In order to decrease a back pressure and to enhance exhaust efficiency, the waste gate valve 45 is controlled such that the waste gate opening degree is a maximum opening degree regardless of the engine operating state. Accordingly, in the supercharging SI operation range in which the waste gate valve 45 is controlled to a target opening degree lower than the maximum opening degree based on the engine load to control a supercharging pressure, a ratio of exhaust gas staying in the exhaust port 15 or the exhaust manifold 41 to the exhaust gas discharged from the combustion chamber 11 in the exhaust stroke can be decreased. Accordingly, even when the exhaust valve 60 is opened in the intake stroke in the supercharging SI operation range, the amount of exhaust gas which is sucked back into the combustion chamber 11 via the exhaust port 15 in the intake stroke can be decreased. As a result, it is possible to decrease the amount of internal EGR gas. When the engine operating state is in the natural intake SI operation range, the electronic control unit 200 controls the waste gate valve 45 such that the waste gate opening degree is the maximum opening degree in the normal state.

In this embodiment, the supercharging pressure is controlled by controlling the opening degree of the waste gate valve 45 in the supercharging SI operation range, but the method of controlling the supercharging pressure is not limited thereto. For example, a flow rate of exhaust gas for driving the turbine wheel 72b may be changed in the turbine housing 72a, for example, by providing a variable nozzle 72c as a throttle valve outside the turbine wheel 72b and changing a nozzle opening degree (a valve opening degree) of the variable nozzle 72c. That is, the rotation speed of the turbine wheel 72b may be changed to change the supercharging pressure by changing the nozzle opening degree of the variable nozzle 72c. Since the flow rate of exhaust gas increases to increase the rotation speed of the turbine wheel 72b by decreasing the nozzle opening degree of the variable nozzle 72c (narrowing the variable nozzle), it is possible to increase the supercharging pressure. Accordingly, when the supercharging pressure is controlled by the variable nozzle 72c and switching failure has occurred, the variable nozzle 72c is controlled such that the nozzle opening degree is the maximum opening degree or an opening degree higher than the target opening degree in the second operation range.

Figure 11:
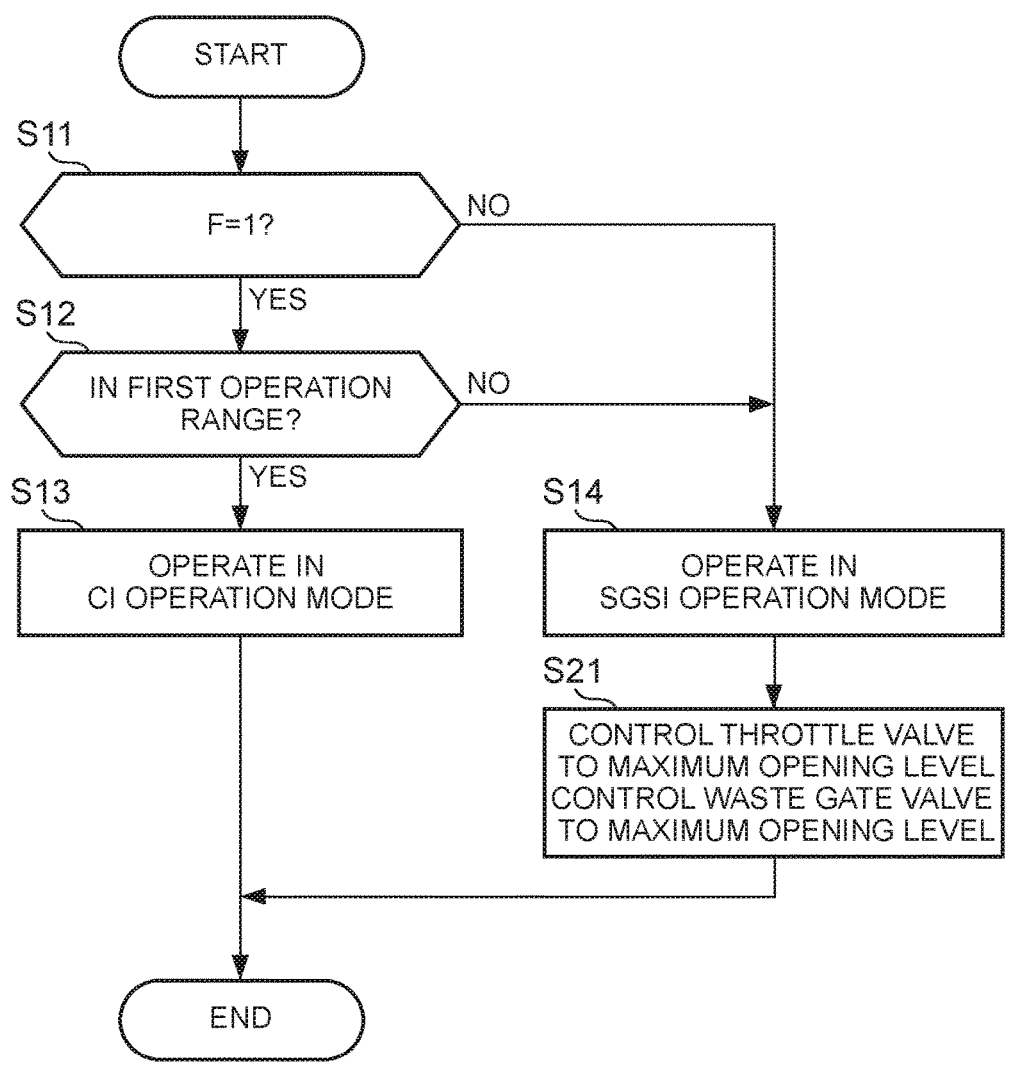
FIG. 11 is a flowchart illustrating combustion control according to a second embodiment of the disclosure when switching failure has occurred.

FIG. 11 is a flowchart illustrating combustion control according to this embodiment when switching failure has occurred. The electronic control unit 200 repeatedly performs this routine with a predetermined calculation cycle during operation of an engine.

The processes of Steps S11 to S14 are the same as in the first embodiment and thus description thereof will not be repeated.

In Step S21, the electronic control unit 200 performs internal EGR gas decreasing control. In this embodiment, the electronic control unit 200 controls the throttle valve 36 such that the throttle opening degree is a maximum opening degree and controls the waste gate valve 45 such that the waste gate opening degree is a maximum opening degree, regardless of the engine load.

In this embodiment, the throttle valve 36 is controlled such that the throttle opening degree is a full opening degree regardless of the engine load, but the throttle valve 36 has only to be controlled such that the throttle opening degree is an opening degree higher than the target opening degree in the normal state depending on the engine load in at least the natural intake SI operation range. The waste gate valve 45 is controlled such that the waste gate opening degree is a maximum opening degree regardless of the engine load state, but the waste gate valve 45 has only to be controlled such that the waste gate opening degree is an opening degree higher than the target opening degree in the normal state depending on the engine load state in at least the supercharging SI operation range.

Figure 12:
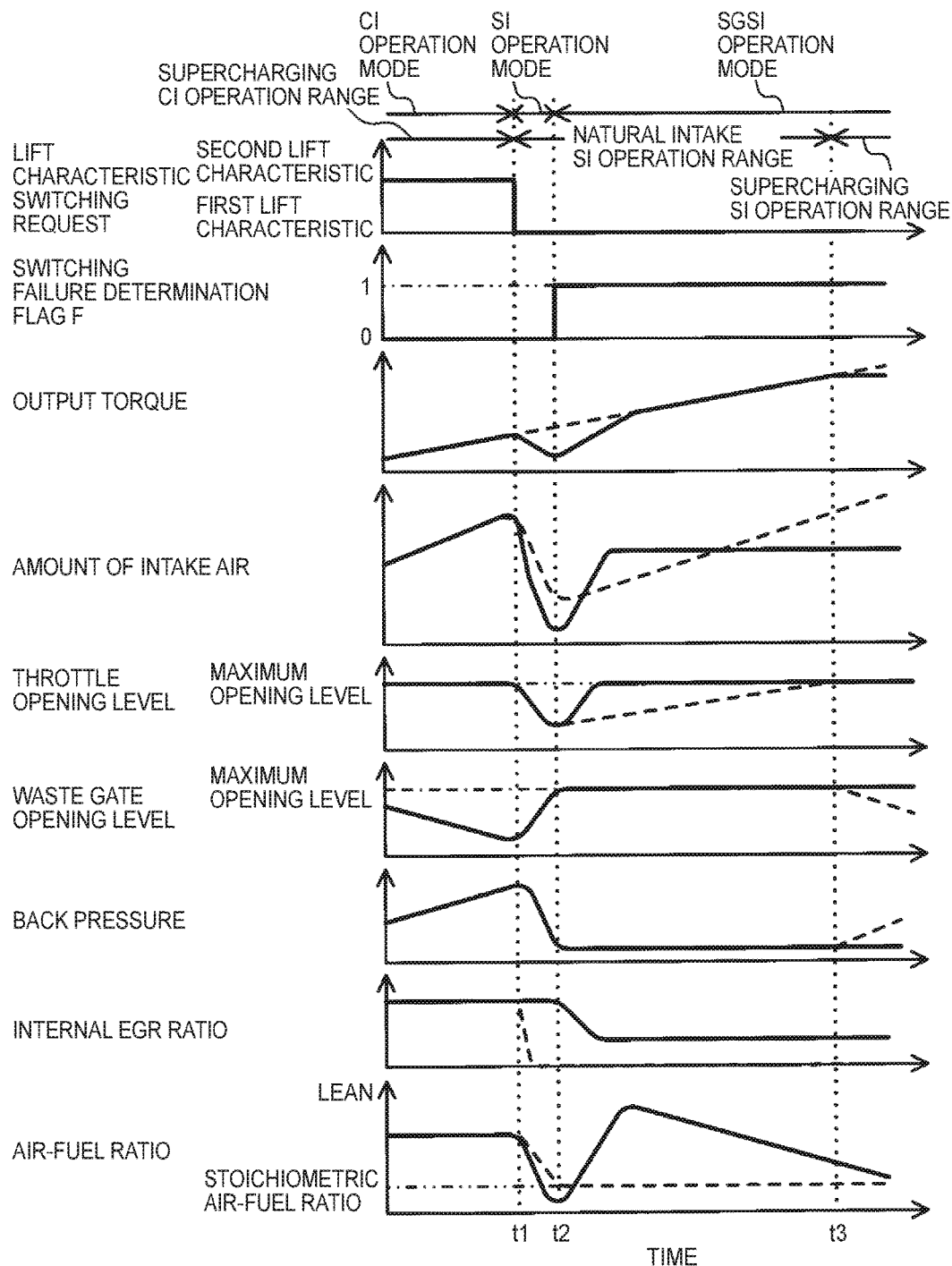
FIG. 12 is a timing chart illustrating operations of various parameters according to the second embodiment of the disclosure when switching failure has occurred.

FIG. 12 is a timing chart illustrating operations of various parameters when switching failure has occurred. Solid lines in FIG. 12 denote the operations of various parameters when switching failure has occurred. On the other hand, dotted lines denote the operations of various parameters in the normal state.

At time t1, when the engine operating state is changed from the CI operation range (more specifically, the supercharging CI operation range) to the SI operation range (more specifically, the natural intake SI operation range), the operation mode is switched from the CI operation mode to the SI operation mode. Accordingly, after time t1, the throttle valve 36 controlled to the maximum opening degree in the supercharging CI operation range before time t1 is controlled to the target opening degree depending on the engine load.

At time t1, when the engine operating state is changed from the CI operation range to the SI operation range, the lift characteristic is switched from the second lift characteristic to the first lift characteristic. At this time, when switching failure has occurred, exhaust gas is sucked back into the cylinder 10 in the intake stroke and thus the actual amount of intake air becomes less than the target amount of intake air by the amount of exhaust gas. Accordingly, when switching failure has occurred, the actual amount of intake air becomes less than the target amount of intake air and the output torque becomes less than the output torque in the normal state after time t1.

At time t2, when a difference value obtained by subtracting the actual amount of intake air from the target amount of intake air in the normal state is equal to or greater than a predetermined threshold value, it is determined that switching failure has occurred and the switching failure determination flag F is set to 1. Accordingly, after time t2, the operation mode is switched from the SI operation mode to the SGSI operation mode.

After time t2, regardless of the engine load, the throttle valve 36 is controlled such that the throttle opening degree is the maximum opening degree and the waste gate valve 45 is controlled such that the waste gate opening degree is the maximum opening level.

Accordingly, even when the exhaust valve 60 is opened in the intake stroke in the natural intake SI operation range up to time t3 in which the throttle opening degree is controlled to the target opening degree lower than the maximum opening degree based on the engine load in the normal state, the amount of exhaust gas which is sucked back into the combustion chamber 11 via the exhaust port 15 can be decreased by an amount corresponding to the increase in the amount of intake air. As a result, it is possible to decrease the amount of internal EGR gas.

Even when the exhaust valve 60 is opened in the intake stroke in the supercharging SI operation range after time t3 in which the waste gate valve 45 is controlled to the target opening degree lower than the maximum opening degree based on the engine load in the normal state, the amount of exhaust gas which is sucked back into the combustion chamber 11 via the exhaust port 15 in the intake stroke can be decreased. As a result, it is possible to decrease the amount of internal EGR gas.

The electronic control unit 200 (the controller) according to this embodiment further includes a throttle control unit that controls the opening degree of the throttle valve 36 disposed in the intake air passage 30 of the internal combustion engine 100 to the target opening degree based on the engine load. The throttle control unit is configured to control the opening degree of the throttle valve 36 in the second operation range to the maximum opening degree or an opening degree higher than the target opening degree when switching failure has occurred.

Accordingly, in the natural intake SI operation range in which the throttle opening degree is controlled to the target opening degree lower than the maximum opening degree based on the engine load, it is possible to increase the amount of intake air which is introduced as new air into the combustion chamber 11 via the intake port 14 in the intake stroke. Accordingly, even when the exhaust valve 60 is opened in the intake stroke in the natural intake SI operation range, the amount of exhaust gas which is sucked back into the combustion chamber 11 via the exhaust port 15 can be decreased by an amount corresponding to the increase in the amount of intake air and thus the amount of internal EGR gas can be decreased. As a result, since an increase in the cylinder temperature can be suppressed, it is possible to prevent occurrence of abnormal combustion. Since the amount of internal EGR gas decreases, it is possible to prevent occurrence of misfiring.

The electronic control unit 200 (the controller) according to this embodiment further includes a supercharging pressure control unit that controls the opening degree of the waste gate valve 45 or the variable nozzle 72c for adjusting the flow rate of exhaust gas flowing into the turbine 72 of the exhaust turbocharger 7 disposed in the exhaust gas passage 42 of the internal combustion engine 100 to the target opening degree based on the engine load. The supercharging pressure control unit is configured to control the opening degree of the waste gate valve 45 or the variable nozzle 72c in the second operation range to the maximum opening degree or an opening degree higher than the target opening degree when switching failure has occurred.

Accordingly, in the supercharging SI operation range in which the waste gate valve 45 is controlled to the target opening degree lower than the maximum opening degree based on the engine load, it is possible to decrease the ratio of exhaust gas staying in the exhaust port 15 or the exhaust manifold 41 to the exhaust gas discharged from the combustion chamber 11 in the exhaust stroke. Accordingly, even when the exhaust valve 60 is opened in the intake stroke in the supercharging SI operation range, the amount of exhaust gas which is sucked back into the combustion chamber 11 via the exhaust port 15 in the intake stroke can be decreased and thus the amount of internal EGR gas can be decreased. As a result, since an increase in the cylinder temperature can be suppressed, it is possible to prevent occurrence of abnormal combustion. Since the amount of internal EGR gas decreases, it is possible to prevent occurrence of misfiring.

A third embodiment of the disclosure will be described below. This embodiment is different from the second embodiment, in details of the internal EGR gas decreasing control. The difference will be mainly described below.

In the second embodiment, the throttle valve 36 and the waste gate valve 45 are controlled as the internal EGR gas decreasing control, but the variable exhaust phase mechanism 63 is controlled in this embodiment. Specifically, the variable exhaust phase mechanism 63 is controlled such that the valve opening timing of the exhaust valve 60 in the intake stroke is a timing at which a rate of change in volume of the combustion chamber 11 decreases relatively (a timing at which a moving speed of the piston 12 decreases relatively).

Since the piston 12 reciprocates in each cylinder 10, the moving speed of the piston in each stroke is higher in the middle stage than in the initial and final stages of each stroke. That is, the rate of change in volume of the combustion chamber 11 in each stroke is higher in the middle stage than in the initial and final stages of each stroke.

In the intake stroke, the higher the rate of change in volume of the combustion chamber 11 becomes, the higher the flow rate of exhaust gas sucked into the combustion chamber 11 per unit time becomes. Accordingly, the valve opening timing of the exhaust valve 60 in the intake stroke is controlled to the timing at which the rate of change in volume of the combustion chamber 11 decreases relatively. Accordingly, in comparison with a case in which the valve opening timing is controlled to the timing at which the rate of change in volume of the combustion chamber 11 increases relatively, it is possible to decrease the amount of exhaust gas which is sucked back into the combustion chamber 11 via the exhaust port 15 in the intake stroke and to decrease the amount of internal EGR gas.

Therefore, in this embodiment when switching failure has occurred, spray-guided stratified combustion is performed in the second operation range in which the exhaust valve twice-opening operation is not performed in the normal state, and the exhaust phase is advanced or delayed with respect to the reference phase by the variable exhaust phase mechanism 63. Accordingly, the timing at which the exhaust valve 60 is opened in the intake stroke is controlled to the timing at which the rate of change in volume of the combustion chamber 11 decreases relatively.

Figure 13:
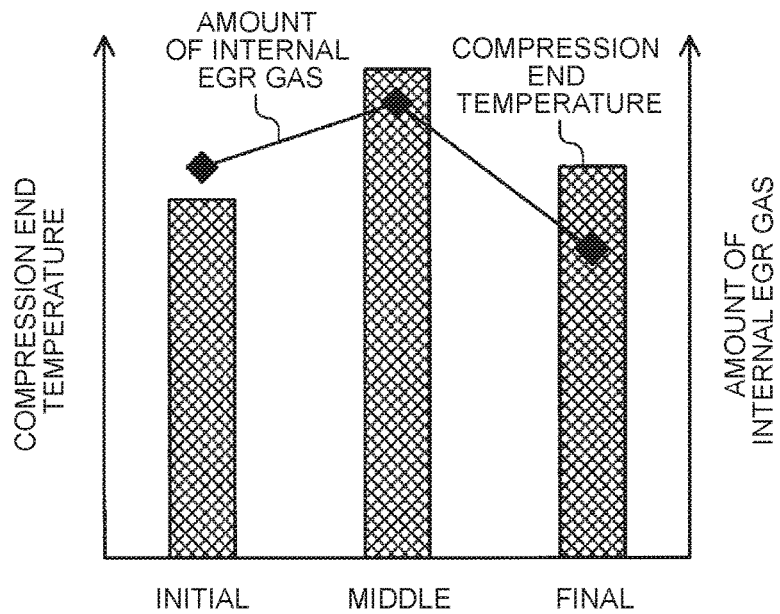
FIG. 13 is a diagram illustrating comparison of an amount of internal EGR gas and a compression end temperature when a timing at which the exhaust valve is opened in an intake stroke is controlled in an initial stage, a middle stage, and a final stage of the intake stroke.
Figure 14:
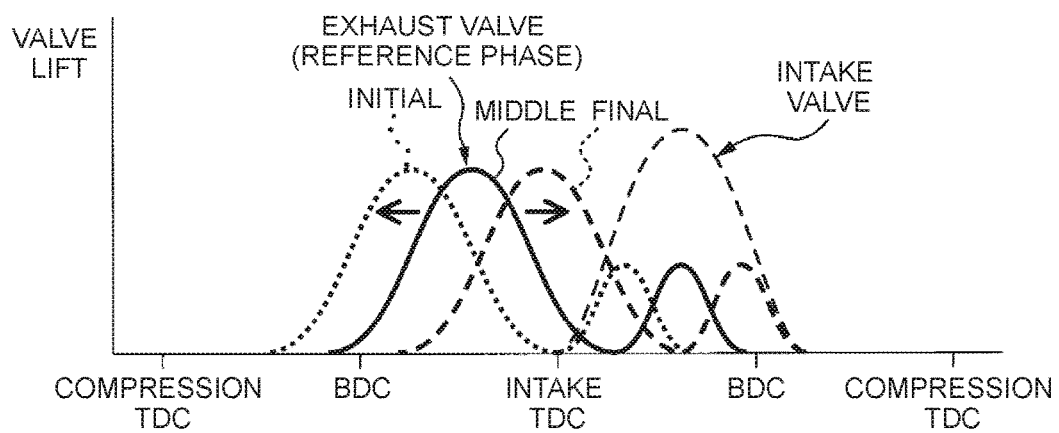
FIG. 14 is a diagram illustrating an example in which an exhaust phase is advanced or delayed with respect to a reference phase by a variable exhaust phase mechanism and a timing at which the exhaust valve is opened in an intake stroke is controlled in an initial stage, a middle stage, and a final stage of the intake stroke.

FIG. 13 is a diagram illustrating comparison of the amount of internal EGR gas and the compression end temperature when the exhaust phase is advanced or delayed with respect to the reference phase by the variable exhaust phase mechanism 63 as illustrated in FIG. 14 and the timing at which the exhaust valve 60 is opened in the intake stroke is controlled in an initial stage, a middle stage, and a final stage of the intake stroke. As illustrated in FIG. 14, in this embodiment, the exhaust phase in which the exhaust valve 60 is opened in the middle stage of the intake stroke is set as the reference phase (the exhaust phase in the normal state).

As illustrated in FIG. 13, when the timing at which the exhaust valve 60 is opened in the intake stroke is controlled to the initial stage and the final stage of the intake stroke, it is possible to decrease the amount of internal EGR gas and the compression end temperature (the cylinder temperature) in comparison with a case in which the timing is controlled to the middle stage.

At this time, when the timing at which the exhaust valve 60 is opened in the intake stroke is controlled to the final stage of the intake stroke, it is possible to decrease the amount of internal EGR gas in comparison with a case in which the timing is controlled to the initial stage. This is because when the valve opening timing of the exhaust valve 60 in the intake stroke is controlled to the final stage of the intake stroke, the exhaust gas is sucked back into the cylinder after a certain amount of air (new air) is sucked into the cylinder.

On the other hand, when the valve opening timing of the exhaust valve 60 in the intake stroke is controlled to the initial stage of the intake stroke, it is possible to decrease the compression end temperature in comparison with a case in which the timing is controlled to the final stage. This is because when the valve opening timing of the exhaust valve 60 in the intake stroke is controlled to the initial stage of the intake stroke, the amount of internal EGR gas increases but the period in which gas in the cylinder is cooled by heat exchange with the inner wall surface of the cylinder 10 in the intake stroke increases, in comparison with the timing is controlled to the final stage.

Accordingly, when it is particularly intended to prevent abnormal combustion, the valve opening timing of the exhaust valve 60 in the intake stroke has only to be controlled to the initial stage of the intake stroke. On the other hand, when it is particularly intended to prevent occurrence of misfiring, the valve opening timing of the exhaust valve 60 in the intake stroke has only to be controlled to the final stage of the intake stroke. To which of the initial stage and the final stage of the intake stroke the valve opening timing of the exhaust valve 60 in the intake stroke is controlled can be appropriately selected from the above-mentioned viewpoint.

Figure 15:
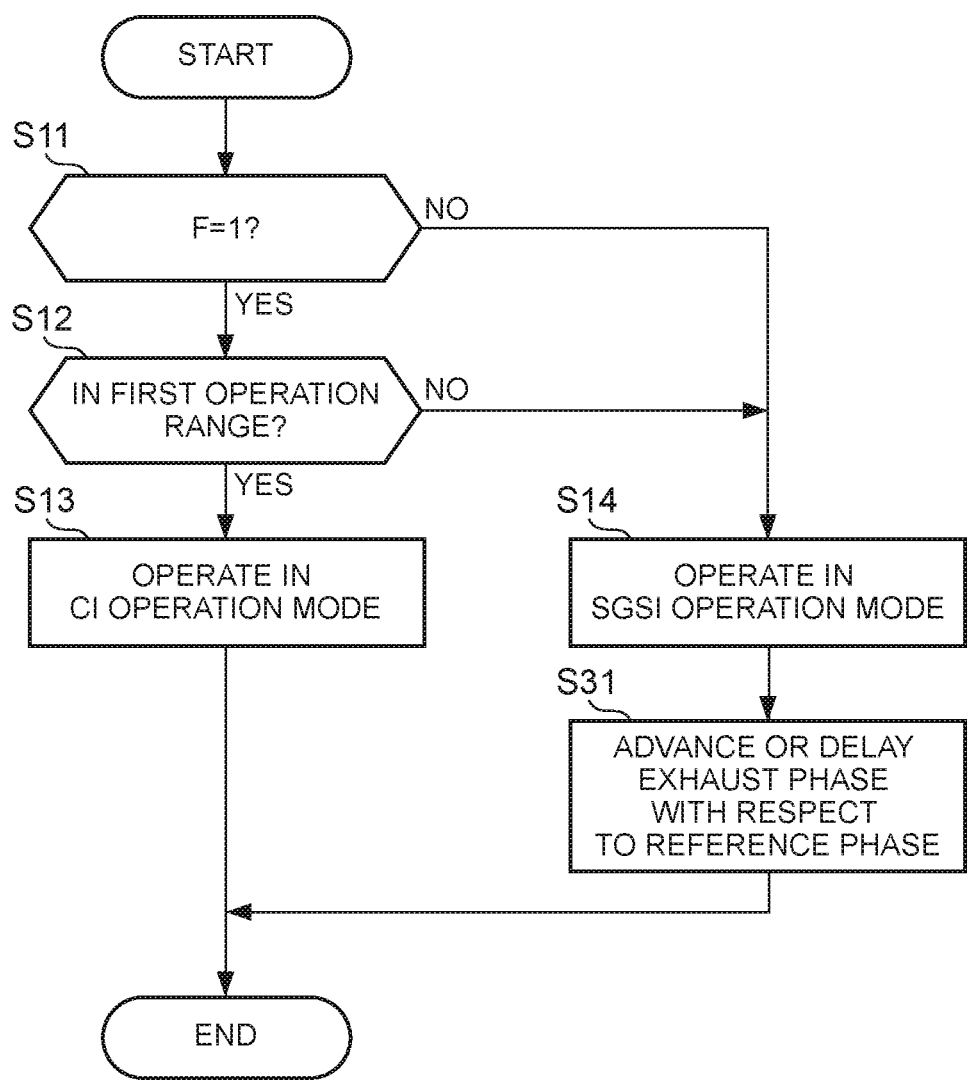
FIG. 15 is a flowchart illustrating combustion control according to a third embodiment of the disclosure when switching failure has occurred.

FIG. 15 is a flowchart illustrating combustion control according to this embodiment when switching failure has occurred. The electronic control unit 200 repeatedly performs this routine with a predetermined calculation cycle during operation of an engine.

The processes of Steps S11 to S14 are the same as in the first embodiment and thus description thereof will not be repeated herein.

In Step S31, the electronic control unit 200 performs the internal EGR gas decreasing control. In this embodiment, the electronic control unit 200 advances or delays the exhaust phase with respect to the reference phase using the variable exhaust phase mechanism 63 and controls the valve opening timing of the exhaust valve 60 in the intake stroke to a timing at which the rate of change in volume of the combustion chamber 11 decreases relatively.

At this time, when the exhaust phase is advanced with respect to the reference phase by the variable exhaust phase mechanism 63 and the valve opening timing of the exhaust valve 60 in the intake stroke is controlled to the initial stage of the intake stroke, an increase in the cylinder temperature can be effectively suppressed and abnormal combustion can be more effectively prevented. On the other hand, when the exhaust phase is delayed with respect to the reference phase by the variable exhaust phase mechanism 63 and the valve opening timing of the exhaust valve 60 in the intake stroke is controlled to the final stage of the intake stroke, an increase in the amount of internal EGR gas can be effectively suppressed and misfiring can be more effectively prevented.

Figure 16:
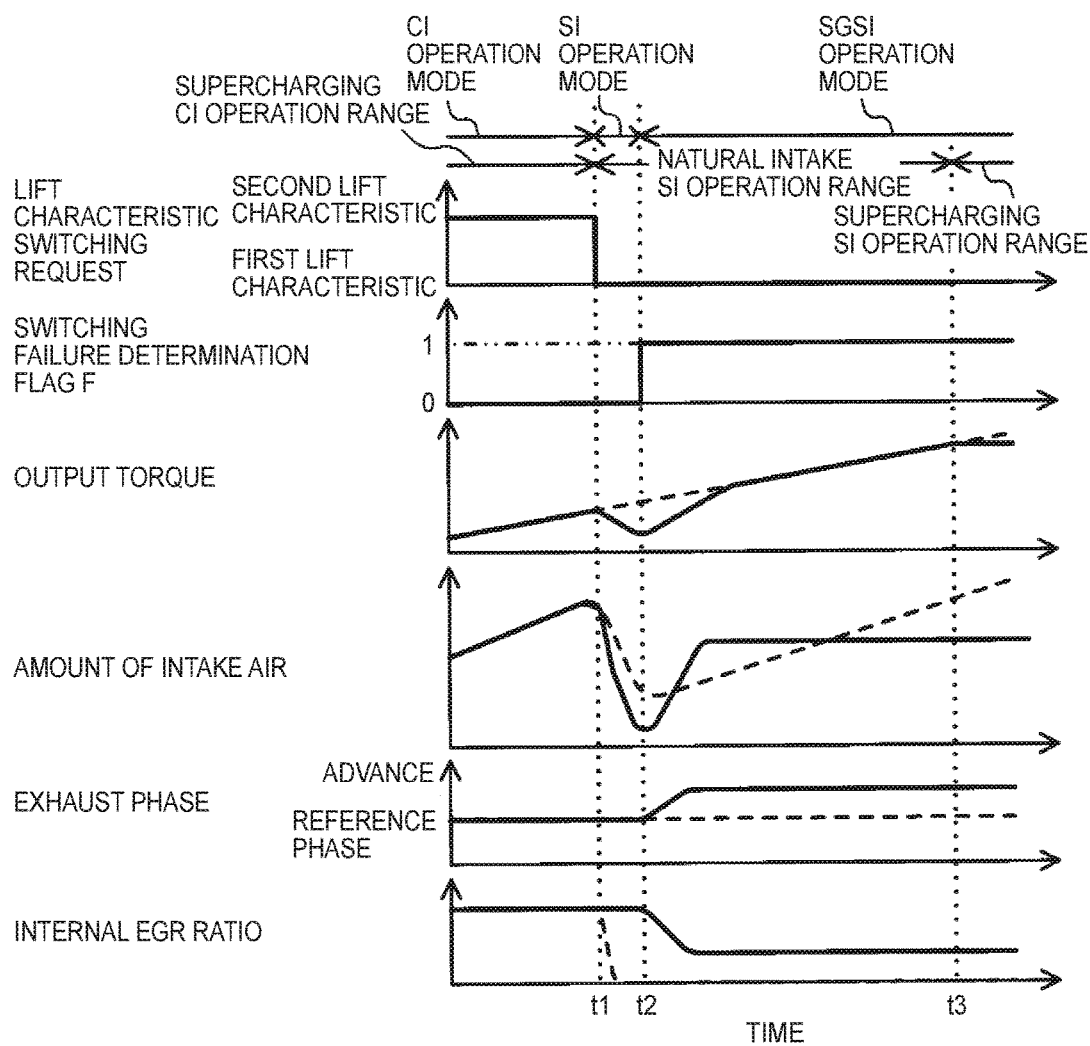
FIG. 16 is a timing chart illustrating operations of various parameters according to the third embodiment of the disclosure when switching failure has occurred.

FIG. 16 is a timing chart illustrating operations of various parameters when switching failure has occurred. Solid lines in FIG. 16 denote the operations of various parameters when switching failure has occurred. On the other hand, dotted lines denote the operations of various parameters in the normal state.

At time t2, when the difference value obtained by subtracting the actual amount of intake air from the target amount of intake air in the normal state is equal to or greater than a predetermined threshold value and it is determined that switching failure has occurred, the switching failure determination flag is set to 1. Accordingly, after time t2, the operation mode is switched from the SI operation mode to the SGSI operation mode.

In addition, the valve opening timing of the exhaust valve 60 in the intake stroke is controlled to the timing at which the rate of change in volume of the combustion chamber 11 decreases relatively by the variable exhaust phase mechanism 63. In this timing chart, the exhaust phase is advanced with respect to the reference phase by the variable exhaust phase mechanism 63 and the valve opening timing of the exhaust valve 60 in the intake stroke is controlled to the initial stage of the intake stroke. In this way, by controlling the valve opening timing of the exhaust valve 60 in the intake stroke to the timing at which the rate of change in volume of the combustion chamber 11 decreases, it is possible to decrease the amount of exhaust gas which is sucked back into the combustion chamber 11 via the exhaust port 15 in the intake stroke, in comparison with a case in which the valve opening timing is controlled to a timing at which the rate of change in volume of the combustion chamber 11 increases relatively. As a result, it is possible to decrease the amount of internal EGR gas.

In this embodiment, when switching failure has occurred, only the variable exhaust phase mechanism 63 is controlled. However, as in the second embodiment, the timing at which the exhaust valve 60 is opened in the intake stroke may be controlled to the timing at which the rate of change in volume of the combustion chamber 11 decreases relatively while controlling the throttle valve 36 such that throttle opening degree is the maximum and controlling the waste gate valve 45 such that waste gate opening degree is the maximum regardless of the engine load by the variable exhaust phase mechanism 63. Accordingly, it is possible to further decrease the amount of internal EGR gas.

The electronic control unit 200 (the controller) according to this embodiment further includes an exhaust phase control unit that controls the variable exhaust phase mechanism 63 capable of changing the exhaust phase which is the phase of the exhaust cam shaft 61 with respect to the crank shaft. When switching failure has occurred, the exhaust phase control unit is configured to change the exhaust phase such that the valve opening timing of the exhaust valve 60 in the intake stroke is the timing at which the rate of change in volume of the combustion chamber 11 in the intake stroke decreases relatively in the second operation range.

Accordingly, in comparison with a case in which the valve opening timing of the exhaust valve 60 in the intake stroke is controlled to a timing at which the rate of change in volume of the combustion chamber 11 increases relatively, it is possible to decrease the amount of exhaust gas which is sucked back into the combustion chamber 11 via the exhaust port 15 in the intake stroke and to decrease the amount of internal EGR gas. Accordingly, it is possible to prevent occurrence of misfiring and to suppress an increase in the cylinder temperature, thereby preventing occurrence of abnormal combustion.

At this time, by changing the exhaust phase such that the valve opening timing of the exhaust valve in the intake stroke is the initial stage of the intake stroke, the period in which gas in the cylinder in the intake stroke is cooled by heat exchange with the inner wall surface of the cylinder 10 and it is thus possible to effectively suppress an increase in the cylinder temperature. Accordingly, it is possible to more effectively prevent abnormal combustion.

On the other hand, the exhaust phase is changed such that the valve opening timing of the exhaust valve in the intake stroke is the final stage of the intake stroke. Accordingly, since exhaust gas is sucked back after a certain amount of air (new air) is sucked into the cylinder 10, it is possible to effectively suppress an increase in the amount of internal EGR gas. As a result, it is possible to effectively prevent misfiring.

A fourth embodiment of the disclosure will be described below. This embodiment is different from the first to third embodiments, in that when switching failure has occurred, control for decreasing an actual compression ratio is performed. The difference will be mainly described below.

In the second and third embodiments, when switching failure has occurred, the cylinder temperature is decreased to prevent occurrence of abnormal combustion by decreasing the amount of internal EGR gas in the second operation range. On the other hand, in this embodiment, when switching failure has occurred, the cylinder temperature (the compression end temperature) is decreased to prevent occurrence of abnormal combustion by decreasing the actual compression ratio in the second operation range in comparison with in the normal state.

Specifically, the actual compression ratio is decreased by advancing or delaying the intake phase using the variable intake phase mechanism 53 and advancing or delaying a valve closing timing of the intake valve in a direction in which the timing moves away from an intake bottom dead center in comparison with in the normal state. Accordingly, since the cylinder temperature (the compression end temperature) can be decreased in comparison with in the normal state, it is possible to prevent occurrence of abnormal combustion.

Figure 17:
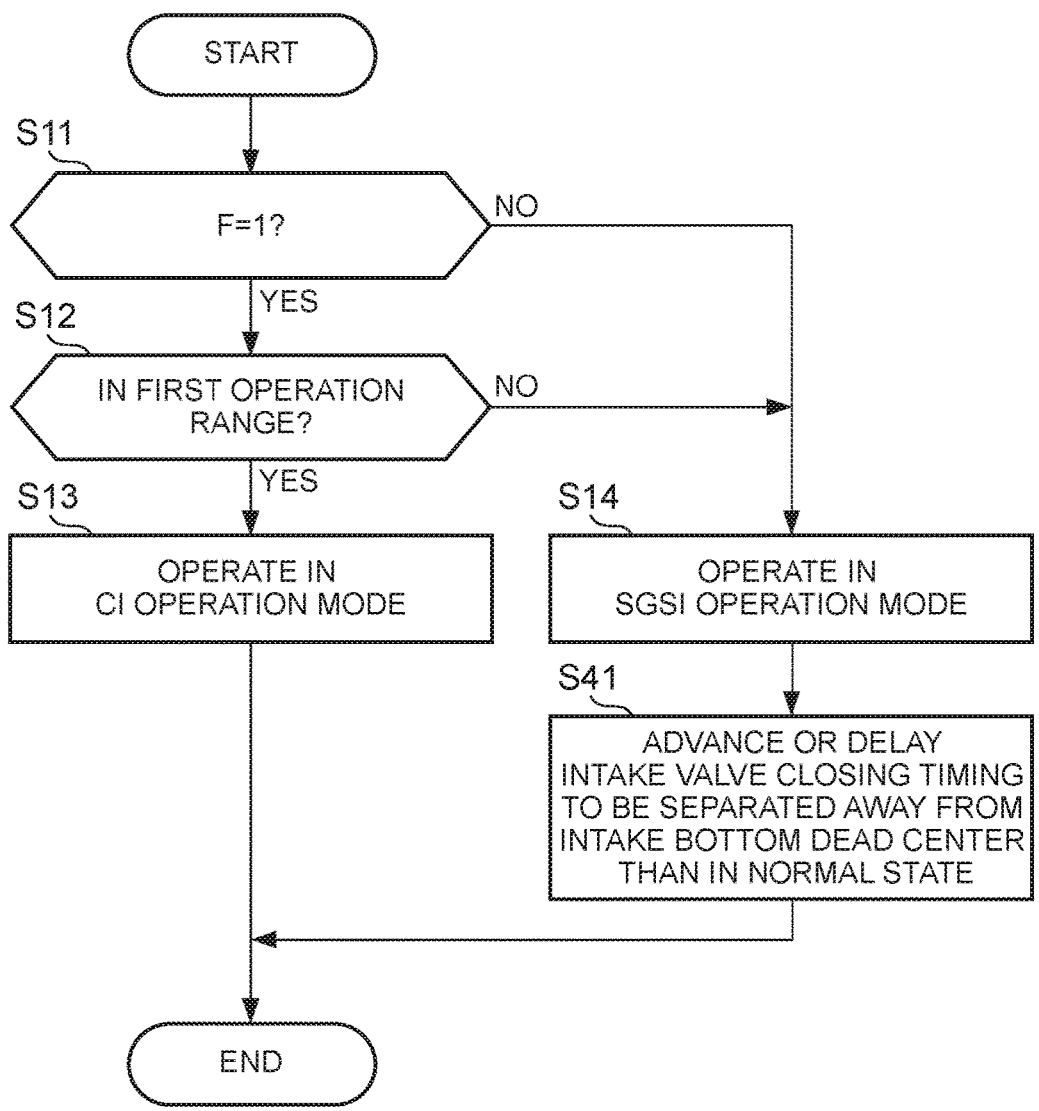
FIG. 17 is a flowchart illustrating combustion control according to a fourth embodiment of the disclosure when switching failure has occurred.

FIG. 17 is a flowchart illustrating combustion control according to this embodiment when switching failure has occurred. The electronic control unit 200 repeatedly performs this routine with a predetermined calculation cycle during operation of an engine.

The processes of Steps S11 to S14 are the same as in the first embodiment and thus description thereof will not be repeated herein.

In Step S41, the electronic control unit 200 decreases the actual compression ratio by advancing or delaying the intake phase using the variable intake phase mechanism 53 and advancing or delaying the valve closing timing of the intake valve in the direction in which the timing moves away from an intake bottom dead center in comparison with in the normal state.

Figure 18:
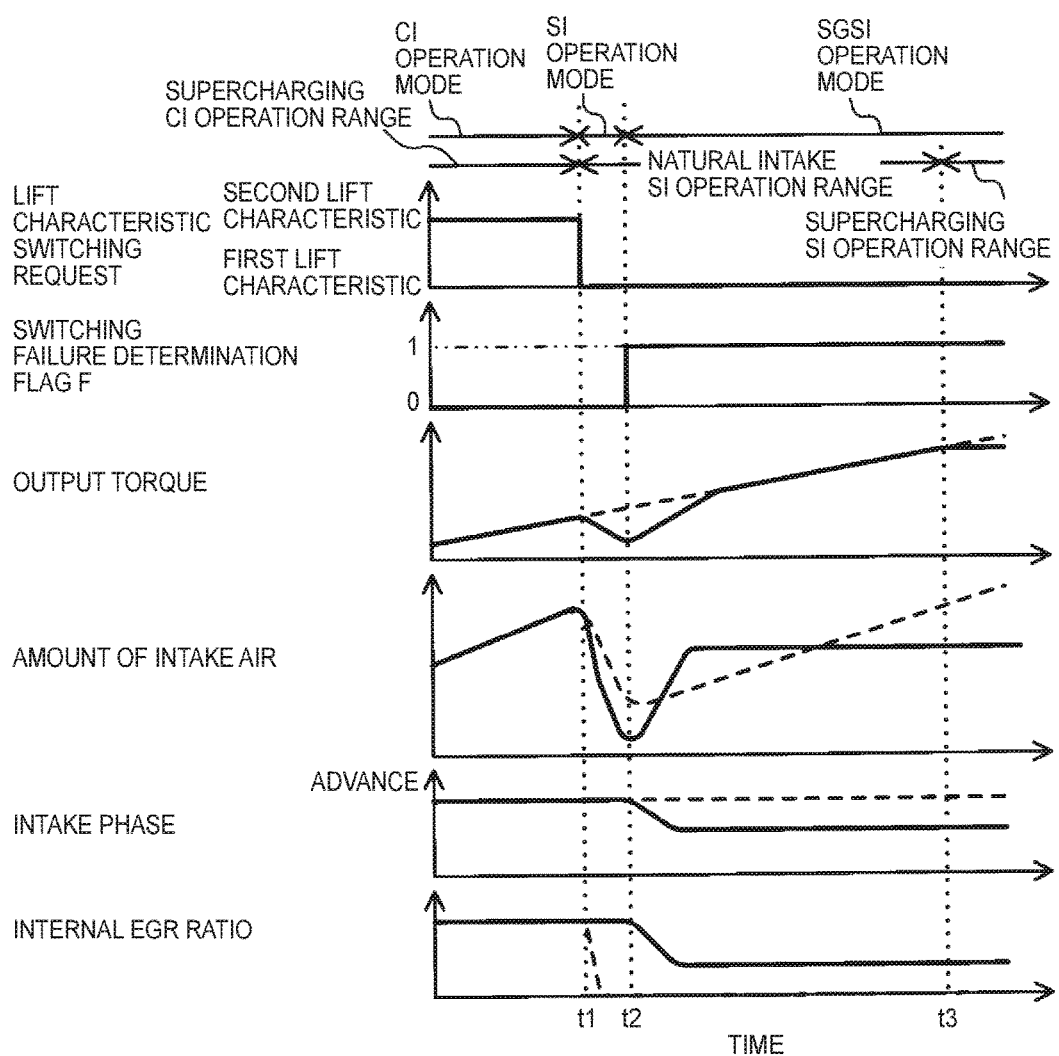
FIG. 18 is a timing chart illustrating operations of various parameters according to the fourth embodiment of the disclosure when switching failure has occurred.

FIG. 18 is a timing chart illustrating operations of various parameters when switching failure has occurred. Solid lines in FIG. 18 denote the operations of various parameters when switching failure has occurred. On the other hand, dotted lines denote the operations of various parameters in the normal state.

At time t2, when the difference value obtained by subtracting the actual amount of intake air from the target amount of intake air in the normal state is equal to or greater than a predetermined threshold value and it is determined that switching failure has occurred, the switching failure determination flag is set to 1. Accordingly, after time t2, the operation mode is switched from the SI operation mode to the SGSI operation mode.

In addition, the actual compression ratio is decreased by advancing or delaying the intake phase using the variable intake phase mechanism 53 and advancing or delaying the valve closing timing of the intake valve in the direction in which the timing moves away from an intake bottom dead center in comparison with in the normal state. In this timing chart, the valve closing timing of the intake valve is delayed in the direction in which the timing moves away from an intake bottom dead center by delaying the intake phase with respect to that in the normal state using the variable intake phase mechanism 53. In this way, by decreasing the actual compression ratio in this way, it is possible to decrease the cylinder temperature (the compression end temperature) in comparison with in the normal state, thereby preventing occurrence of abnormal combustion.

As in the second embodiment, the intake phase may be controlled such that the valve closing timing of the intake valve is advanced or delayed with respect to the intake bottom dead center using the variable intake phase mechanism 53 while controlling the throttle valve 36 such that throttle opening degree is the maximum and controlling the waste gate valve 45 such that waste gate opening degree is the maximum regardless of the engine load. Accordingly, since the cylinder temperature can be further decreased, it is possible to further prevent occurrence of abnormal combustion.

Figure 19:
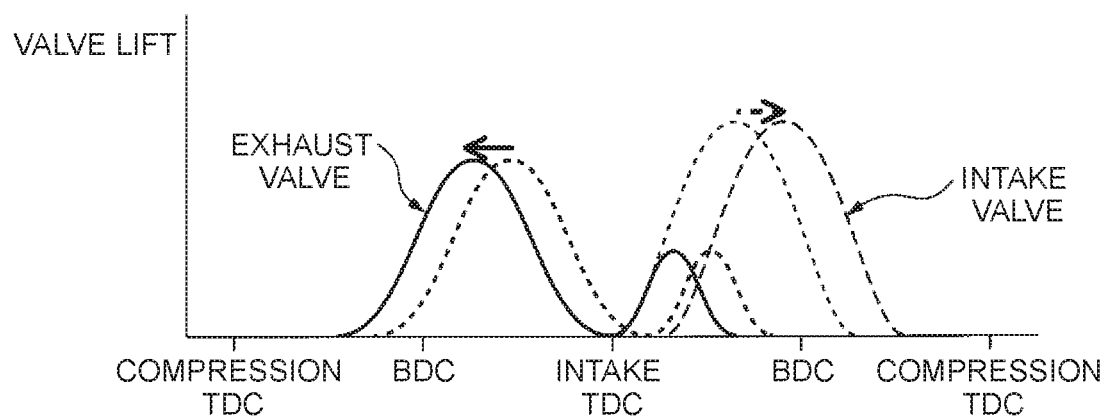
FIG. 19 is a diagram illustrating an example of a valve opening timing of the intake valve and the exhaust valve when switching failure has occurred.

In addition, the variable exhaust phase mechanism 63 may be controlled as in the third embodiment. In this case, for example, as illustrated in FIG. 19, by advancing the exhaust phase as much as possible using the variable exhaust phase mechanism 63 and delaying the intake phase as much as possible using the variable intake phase mechanism 53, it is possible to shorten a period in which the intake valve and the exhaust valve 60 are simultaneously opened in the intake stroke. Accordingly, it is possible to further decrease the amount of internal EGR gas and to further decrease the cylinder temperature, thereby further preventing occurrence of abnormal combustion or misfiring.

The electronic control unit 200 (the controller) according to this embodiment further includes an intake phase control unit that controls the variable intake phase mechanism 53 capable of changing the intake phase which is the phase of the intake cam shaft 51 with respect to the crank shaft. When switching failure has occurred, the intake phase control unit is configured to change the intake phase in the second operation range and to advance or delay the valve closing timing of the intake valve in the direction in which the timing moves away from the intake bottom dead center in comparison with a case in which switching failure has not occurred.

Accordingly, since the actual compression ratio can be decreased in comparison with that in the normal state to decrease the cylinder temperature (the compression end temperature), it is possible to prevent occurrence of abnormal combustion.

A fifth embodiment of the disclosure will be described below. This embodiment is different from the first embodiment, in that when switching failure has occurred and then the operation mode is switched to the SGSI operation mode, the operation mode is maintained in the SGSI operation mode regardless of the engine operating state. The difference will be mainly described below.

In the first to fourth embodiments, when switching failure has occurred and then the engine operating state is changed to the first operation range in which the exhaust valve twice-opening operation is performed, the operation mode is switched from the SGSI operation mode to the CI operation mode. Then, when the operation mode is switched to the CI operation mode and then the engine operating state is changed to the second operation range in which the exhaust valve twice-opening operation is not performed in the normal state, the operation mode is switched to the SGSI operation mode.

However, when the operation mode is switched, a combustion mode is changed and thus there is concern that combustion will be temporarily destabilized. Therefore, in this embodiment, when switching failure has occurred and then the operation mode is switched to the SGSI operation mode, the operation mode is maintained in the SGSI operation mode regardless of the engine operating state. That is, when switching failure has occurred, spray-guided stratified combustion is performed in all the operation ranges to operate the engine body 1. Accordingly, it is possible to prevent combustion from being destabilized by switching of the operation mode.

Figure 20:
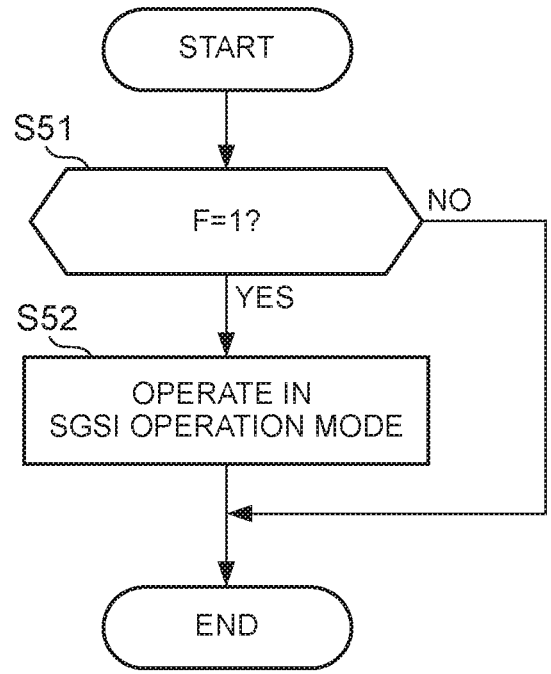
FIG. 20 is a flowchart illustrating combustion control according to a fifth embodiment of the disclosure when switching failure has occurred.

FIG. 20 is a flowchart illustrating combustion control according to this embodiment when switching failure has occurred. The electronic control unit 200 repeatedly performs this routine with a predetermined calculation cycle during operation of an engine.

In Step S51, the electronic control unit 200 determines whether the switching failure determination flag F is set to 1. When the switching failure determination flag F is set to 1, the electronic control unit 200 performs the process of Step S52. On the other hand, when the switching failure determination flag F is set to 0, the electronic control unit 200 ends this routine.

In Step S52, the electronic control unit 200 switches the operation mode to the SGSI operation mode regardless of the engine operating state and operates the engine body 1.

According to the above-mentioned embodiment, a combustion control unit of the electronic control unit 200 (the controller) is configured to perform spray-guided stratified combustion in all the operation ranges when switching failure has occurred. Accordingly, it is possible to prevent combustion from being destabilized by switching of the operation mode.

A sixth embodiment of the disclosure will be described below. This embodiment is different from the first embodiment, in that even when switching failure has occurred and then the engine operating state transitions to an operation range on a higher load side or a higher rotation speed side than the first operation range in which the exhaust valve twice-opening operation is performed in the normal state, the engine body 1 is operated in the first operation range. The difference will be mainly described below.

In the first to fourth embodiments, when switching failure has occurred, occurrence of abnormal combustion is prevented by switching the operation mode to the SGSI operation mode in the second operation range in which the exhaust valve twice-opening operation is not performed in the normal state and operating the engine body 1.

However, even when the operation mode is switched to the SGSI operation mode and the engine body 1 is operated in a situation in which switching failure has occurred, there is concern that abnormal combustion or the like will occur in the second operation range in which the exhaust valve twice-opening operation is not performed in the normal state.

Therefore, in this embodiment, after switching failure has occurred and the engine operating state transitions once to the first operation range in which the exhaust valve twice-opening operation is performed in the normal state, even when the engine operating state transitions to an operation range on a higher load side or a higher rotation speed side than the first operation range, the engine body 1 is operated in the first operation range.

Figure 21:
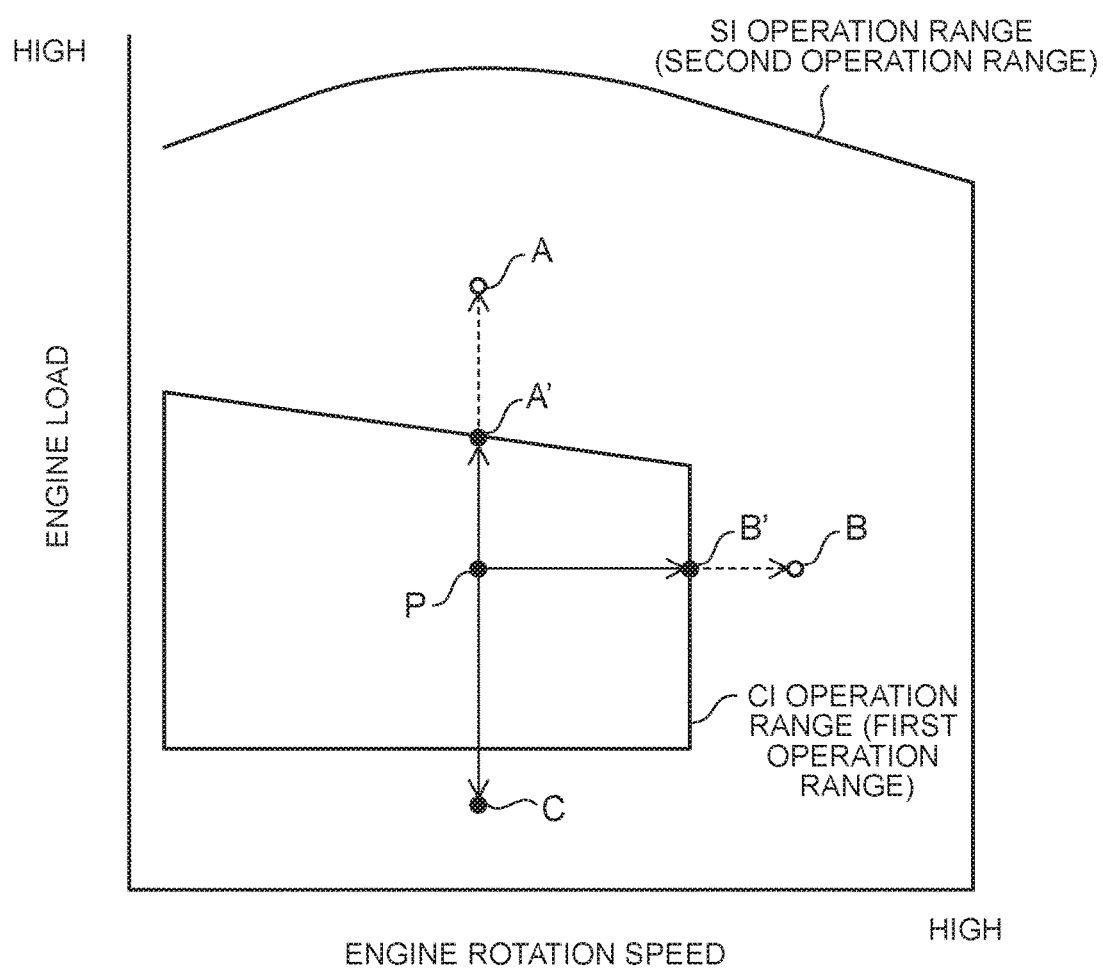
FIG. 21 is a flowchart illustrating combustion control according to a sixth embodiment of the disclosure.

That is, as illustrated in FIG. 21, when switching failure has occurred and the engine operating state transitions once to an engine operating state P in the first operation range in which the exhaust valve twice-opening operation is performed in the normal state and then transitions to, for example, an engine operating state A in an operation range on a higher load side than the first operation range, the engine load is limited to an upper-limit load A' in the first operation range and the engine body 1 is operated with the operation mode maintained in the CI operation mode. When the engine operating state transitions once to the engine operating state P in the first operation range in which the exhaust valve twice-opening operation is performed in the normal state and then transitions to, for example, an engine operating state B in an operation range on a higher rotation speed side than the first operation range, the engine rotation speed is limited to an upper-limit rotation speed B' in the first operation range and the engine body 1 is operated with the operation mode maintained in the CI operation mode.

Accordingly, when switching failure has occurred and the engine operating state transitions once to the first operation range in which the exhaust valve twice-opening operation is performed, the output torque is limited to a torque which can be output in the first operation range and the engine body 1 can be operated with the operation mode maintained in the CI operation mode. Accordingly, when switching failure has occurred, it is possible to prevent occurrence of abnormal combustion or the like which is caused by operating the engine body 1 in the second operation range in which the exhaust valve twice-opening operation is not performed in the normal state.

On the other hand, as illustrated in FIG. 21, when the engine operating state transitions once to the engine operating state P in the first operation range in which the exhaust valve twice-opening operation is performed in the normal state and then transitions to, for example, an engine operating state C in an operation range on a lower load side than the first operation range in which the exhaust valve twice-opening operation is performed, the operation mode is switched to the SGSI operation mode and the engine body 1 is operated.

Accordingly, since stability of combustion in the vicinity of an idle operation range can be guaranteed, it is possible to satisfactorily perform saving travel.

Figure 22:
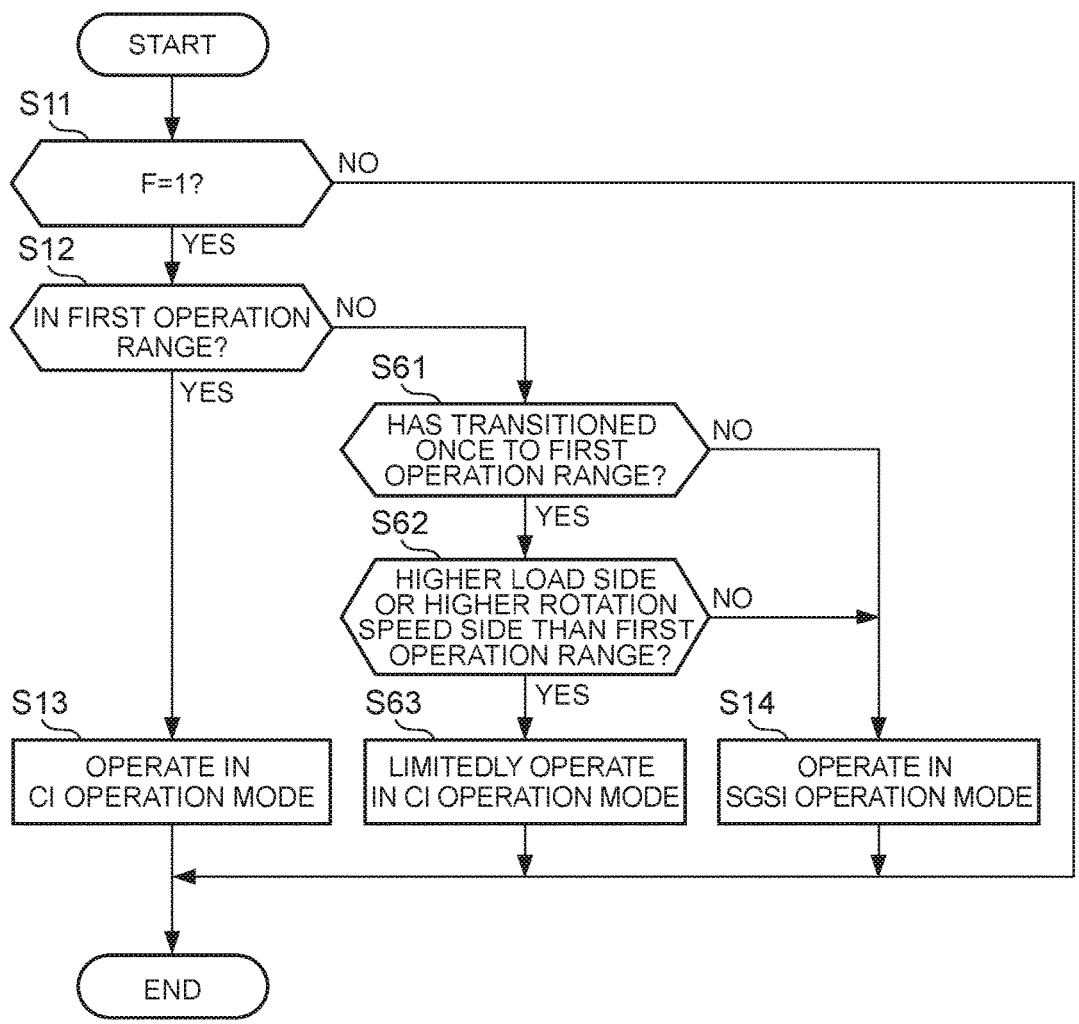
FIG. 22 is a flowchart illustrating combustion control according to the sixth embodiment of the disclosure when switching failure has occurred.

FIG. 22 is a flowchart illustrating combustion control according to this embodiment when switching failure has occurred. The electronic control unit 200 repeatedly performs this routine with a predetermined calculation cycle during operation of an engine.

The processes of Steps S11 to S14 are the same as in the first embodiment and thus description thereof will not be repeated herein.

In Step S61, the electronic control unit 200 determines whether the engine operating state transitions once to the first operation range in which the exhaust valve twice-opening operation is performed in the normal state after it has been determined that switching failure has occurred. The electronic control unit 200 performs the process of Step S62 when the engine operating state transitions once to the first operation range after it has been determined that switching failure has occurred.

The electronic control unit 200 performs the process of Step S14 when the engine operating state has not transitioned once to the first operation range after it has been determined that switching failure has occurred. The reason thereof is as follows. In this embodiment, whether switching failure has occurred is determined in the second operation range in which the exhaust valve twice-opening operation is not performed in the normal state (the SI operation range). Accordingly, when the output torque is limited to the torque which can be output in the first operation range in the step in which switching failure is detected, a sudden variation in torque may be caused.

In Step S62, the electronic control unit 200 determines whether the engine operating state is in an operation range on a higher load side or a higher rotation speed side than the first operation range. The electronic control unit 200 performs the process of Step S63 when the engine operating state is in an operation range on a higher load side or a higher rotation speed side than the first operation range. On the other hand, the electronic control unit 200 performs the process of Step S14 when the engine operating state is not in an operation range on a higher load side or a higher rotation speed side than the first operation range.

In Step S63, the electronic control unit 200 maintains the CI operation mode in the first operation range, limits the output torque to the torque which can be output in the first operation range, and operates the engine body 1.

According to the above-mentioned embodiment, a switching failure determining unit of the electronic control unit 200 (the controller) is configured to determine whether switching failure has occurred in the spark ignition operation range. When the engine operating state transitions from the second operation range to the first operation range after switching failure has occurred, a combustion control unit is configured to prohibit an operation in the second operation range on a higher load side or a higher rotation speed side than the first operation range and to combust fuel in the first operation range by pre-mixture compression ignition combustion.

Accordingly, when switching failure has occurred, it is possible to prevent occurrence of abnormal combustion or the like which occurs by causing the engine body 1 to operate in the second operation range in which the exhaust valve twice-opening operation is not performed in the normal state.

While embodiments of the disclosure have been described above, the above-mentioned embodiments describes only a part of applications of the disclosure and are not intended to limit the technical scope of the disclosure to the specific configurations of the embodiments.

For example, in the embodiments, in combusting an air-fuel pre-mixture in the combustion chamber 11 by compression ignition combustion, ignition-assisted self-ignition combustion in which a part of the fuel may be combusted by flame propagation combustion and the other fuel is combusted by pre-mixture compression ignition combustion using heat which is generated at that time may be performed.

What is claimed is:

1. An internal combustion engine comprising:
   an engine body including cylinders;
   an intake manifold for supplying air into the cylinders;
   an exhaust manifold for discharging exhaust gas from the cylinders;
   a fuel injection valve configured to directly inject fuel into a combustion chamber of the internal combustion engine;
   a spark plug, an electrode portion of the spark plug being disposed in one of the inside of a fuel injection path and the vicinity of the fuel injection path;
   a characteristic switching mechanism configured to switch a lift characteristic between a first lift characteristic and a second lift characteristic, the first lift characteristic being a lift characteristic of an exhaust valve of opening the exhaust valve in an exhaust stroke, the second lift characteristic being a lift characteristic of the exhaust valve of opening the exhaust valve in the exhaust stroke and an intake stroke; and
   an electronic control unit having a non-transitory computer-readable memory storing executable instructions:
      to control the fuel injection valve and the spark plug such that fuel is combusted by one of pre-mixture compression ignition combustion and flame propagation combustion;
      to switch the lift characteristic of the exhaust valve to the second lift characteristic using the characteristic switching mechanism in a predetermined first operation range, the predetermined first operation range including at least a part of a compression ignition operation range, the compression ignition operation range being a range in which fuel is combusted by the pre-mixture compression ignition combustion;
      to switch the lift characteristic of the exhaust valve to the first lift characteristic using the characteristic switching mechanism in a predetermined second operation range, the predetermined second operation range including at least a flame ignition operation range, the flame ignition operation range being a range in which fuel is combusted by the flame propagation combustion;
      to determine whether switching failure has occurred, the switching failure being failure in which the lift characteristic of the exhaust valve is not switchable from the second lift characteristic to the first lift characteristic using the characteristic switching mechanism;
      to control the spark plug to ignite fuel to perform homogeneous combustion in the flame ignition operation range when the electronic control unit determines that the switching failure has not occurred;
         wherein the homogeneous combustion is a combustion in which fuel homogeneously diffused into the combustion chamber is ignited by the spark plug and is combusted by the flame propagation combustion; and
      to control the fuel injection valve to perform spray-guided stratified combustion in the second operation range when the electronic control unit determines that the switching failure has occurred;
         wherein with the spray-guided stratified combustion is a combustion in which fuel in the fuel injection path is ignited by the spark plug and is combusted by the flame propagation combustion.

2. The internal combustion engine according to claim 1, further comprising:
   a throttle valve disposed in an intake air passage;
   wherein the electronic control unit further includes executable instructions to control an opening degree of the throttle valve such that the opening degree becomes a target opening degree based on an engine load; and
   when the electronic control unit determines that the switching failure has occurred, the electronic control unit is configured to control the opening degree of the throttle valve to become at least one of a maximum opening degree and an opening degree greater than the target opening degree in the second operation range.

3. The internal combustion engine according to claim 1, further comprising:
   an exhaust turbocharger disposed in an exhaust gas passage; and
   an exhaust gas adjuster configured to adjust a flow rate of exhaust gas flowing into a turbine of the exhaust turbocharger;
   wherein the exhaust gas adjuster is one of a waste gate valve and a variable nozzle;
   wherein the electronic control unit further includes executable instructions to control an opening degree of the exhaust gas adjuster such that the opening degree becomes a target opening degree based on an engine load; and
   wherein when the electronic control unit determines that the switching failure has occurred, the electronic control unit is configured to control the opening degree of the exhaust gas adjuster to become at least one of a maximum opening degree and an opening degree greater than the target opening degree in the second operation range.

4. The internal combustion engine according to claim 1, further comprising:
a variable exhaust phase mechanism configured to change an exhaust phase;
wherein the exhaust phase is a phase of an exhaust cam shaft with respect to a crank shaft;
wherein the electronic control unit further includes executable instructions to change the exhaust phase such that a valve opening timing of the exhaust valve in an intake stroke is a predetermined timing in the second operation range when the electronic control unit determines that the switching failure has occurred;
wherein the predetermined timing is a timing at which a rate of change in volume of the combustion chamber in the intake stroke is relatively small.

5. The internal combustion engine according to claim 4, wherein
the electronic control unit further includes the executable instructions to change the exhaust phase such that the valve opening timing of the exhaust valve in the intake stroke is an initial stage of the intake stroke when the electronic control unit determines that the switching failure has occurred.

6. The internal combustion engine according to claim 4, wherein
the electronic control unit further includes the executable instructions to change the exhaust phase such that the valve opening timing of the exhaust valve in the intake stroke is a final stage of the intake stroke when the electronic control unit determines that the switching failure has occurred.

7. The internal combustion engine according to claim 1, further comprising:
a variable intake phase mechanism configured to change an intake phase;
wherein the intake phase is a phase of an intake cam shaft with respect to a crank shaft;
wherein when the electronic control unit determines that the switching failure has occurred, the electronic control unit further includes executable instructions to change the intake phase in the second operation range such that a valve closing timing of an intake valve is changed by one of the following controls at least one of:
(i) the valve closing timing being advanced in a direction which the valve closing timing moves away from an intake bottom dead center in comparison with a case in which the electronic control unit determines that the switching failure has not occurred; and
(ii) the valve closing timing being retarded in a direction which the valve closing timing moves away from the intake bottom dead center in comparison with a case in which the electronic control unit determines that the switching failure has not occurred.

8. The internal combustion engine according to claim 1, wherein the electronic control unit further the executable instructions to control the fuel injection valve to perform the spray-guided stratified combustion in all the operation ranges when the electronic control unit determines that the switching failure has occurred.

9. The internal combustion engine according to claim 1, wherein
the electronic control unit further includes the executable instructions to determine whether the switching failure has occurred in the flame ignition operation range; and
the electronic control unit further includes the executable instructions to prohibit an operation in a predetermined area and to combust fuel by the pre-mixture compression ignition combustion in the first operation range when the electronic control unit determines that an engine operating state transitions from the second operation range to the first operation range after the switching failure has occurred;
wherein the predetermined area is at least one of the second operation range on a higher load side than the first operation range and the second operation range on a higher rotation speed side than the first operation range.

10. A control method of an internal combustion engine, the internal combustion engine including an engine body including cylinders, an intake manifold for supplying aft into the cylinders, an exhaust manifold for discharging exhaust gas from the cylinders, a fuel injection valve, a spark plug, a characteristic switching mechanism, and an electronic control unit, the fuel injection valve being configured to directly inject fuel into a combustion chamber of the internal combustion engine, an electrode portion of the spark plug being disposed in one of the inside of a fuel injection path and the vicinity of the fuel injection path, the characteristic switching mechanism being configured to switch a lift characteristic between a first lift characteristic and a second lift characteristic, the first lift characteristic being a lift characteristic of an exhaust valve of opening the exhaust valve in an exhaust stroke, the second lift characteristic being a lift characteristic of the exhaust valve of opening the exhaust valve in the exhaust stroke and an intake stroke, the control method comprising:
controlling, by the electronic control unit, the fuel injection valve and the spark plug such that fuel is combusted by one of pre-mixture compression ignition combustion and flame propagation combustion;
switching, by the electronic control unit, the lift characteristic of the exhaust valve to the second lift characteristic in a predetermined first operation range;
switching, by the electronic control unit, the lift characteristic of the exhaust valve to the first lift characteristic in a predetermined second operation range;
determining, by the electronic control unit, whether switching failure has occurred;
wherein when the electronic control unit determines that the switching failure has not occurred, controlling the spark plug to ignite fuel, by the electronic control unit, to perform homogeneous combustion in the flame ignition operation range; and
wherein when the electronic control unit determines that the switching failure has occurred, controlling the fuel injection valve, by the electronic control unit, to perform spray-guided stratified combustion in the second operation range;
wherein the predetermined first operation range includes at least a part of a compression ignition operation range, the compression ignition operation range is a range in which fuel is combusted by the pre-mixture compression ignition combustion;
wherein the predetermined second operation range includes at least a flame ignition operation range, the flame ignition operation range is a range in which fuel is combusted by the flame propagation combustion;

wherein the switching failure is failure in which the lift characteristic of the exhaust valve is not switchable from the second lift characteristic to the first lift characteristic by the electronic control unit, the homogeneous combustion is combustion in which fuel homogeneously diffused into the combustion chamber is ignited by the spark plug and is combusted by the flame propagation combustion; and wherein the spray-guided stratified combustion is combustion in which fuel in the fuel injection path is ignited by the spark plug and is combusted by the flame propagation combustion.

* * * * *